US012463875B2

(12) United States Patent
Kumar et al.

(10) Patent No.: US 12,463,875 B2
(45) Date of Patent: Nov. 4, 2025

(54) APPARATUS, ARTICLES OF MANUFACTURE, AND METHODS TO PARTITION NEURAL NETWORKS FOR EXECUTION AT DISTRIBUTED EDGE NODES

(71) Applicant: Intel Corporation, Santa Clara, CA (US)

(72) Inventors: Karthik Kumar, Chandler, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 17/554,964

(22) Filed: Dec. 17, 2021

(65) Prior Publication Data
US 2022/0109742 A1    Apr. 7, 2022

(51) Int. Cl.
*G06F 15/177* (2006.01)
*G06N 3/04* (2023.01)
(Continued)

(52) U.S. Cl.
CPC ........... *H04L 41/5054* (2013.01); *G06N 3/04* (2013.01); *H04L 41/5019* (2013.01);
(Continued)

(58) Field of Classification Search
CPC . H04L 41/5054; H04L 41/5019; H04L 67/34; H04L 43/08; H04L 67/10;
(Continued)

(56) References Cited

U.S. PATENT DOCUMENTS 9,479,449 B2 * 10/2016 Breternitz ............... H04L 47/70
2020/0021502 A1 * 1/2020 Bernat ................. G06F 9/5094
(Continued)

OTHER PUBLICATIONS

European Patent Office, "Extended European Search Report," issued in connection with European Patent Application No. 22202393.9, dated Apr. 12, 2023, 11 pages.
(Continued)

*Primary Examiner* — John B Walsh
(74) *Attorney, Agent, or Firm* — Hanley, Flight & Zimmerman, LLC

(57) ABSTRACT

Methods, apparatus, systems, and articles of manufacture are disclosed to partition neural network models for executing at distributed Edge nodes. An example apparatus includes processor circuitry to perform at least one of first, second, or third operations to instantiate power consumption estimation circuitry to estimate a computation energy consumption for executing the neural network model on a first edge node, network bandwidth determination circuitry to determine a first transmission time for sending an intermediate result from the first edge node to a second or third edge node, power consumption estimation circuitry to estimate a transmission energy consumption for sending the intermediate result to the second or the third edge node, and neural network partitioning circuitry to partition the neural network model into a first portion to be executed at the first edge node and a second portion to be executed at the second or third edge node.

24 Claims, 15 Drawing Sheets

(51) Int. Cl.
*H04L 41/5019* (2022.01)
*H04L 41/5054* (2022.01)
*H04L 67/00* (2022.01)
*H04L 43/08* (2022.01)
*H04L 67/10* (2022.01)

(52) U.S. Cl.
CPC ............. *H04L 67/34* (2013.01); *H04L 43/08* (2013.01); *H04L 67/10* (2013.01)

(58) Field of Classification Search
CPC . H04L 41/16; H04L 41/0833; H04L 43/0894; G06N 3/04; G06N 3/045; G06N 3/08; G06F 9/5094
See application file for complete search history.

(56) References Cited

U.S. PATENT DOCUMENTS

| | | | |
|---|---|---|---|
| 2021/0004265 A1 | 1/2021 | Guim Bernat et al. | |
| 2021/0360082 A1 | 11/2021 | Pinel et al. | |

OTHER PUBLICATIONS

Wang et al., "Design and implementation of an analytical framework for interference aware job scheduling on Apache Spark platform," Cluster Computing, Springer Science+Business Media, LLC, published online Dec. 23, 2017, 15 pages.

Witt et al., "Predictive Performance Modeling for Distributed Computing using Black-Box Monitoring and Machine Learning," arXiv:1805.11877v1 [cs.DC], May 30, 2018, 19 pages.

Rivas et al., "Large-Scale Video Analytics through Object-Level Consolidation," arXiv, Nov. 30, 2021, 17 pages.

Bouwmans et al., "Scene Background Initizialization: a Taxonomy," Accepted Manuscript, Pattern Recognition Letters, Dec. 29, 2016, 12 pages.

Cai et al., "Cascade R-CNN: Delving into High Quality Object Detection," in Proceedings of the IEEE Conference on Computer Vision and Pattern Recognition, 2018, 9 pages.

Canel et al., "Scaling Video Analytics on Constrained Edge Nodes," arXiv, May 24, 2019, 13 pages.

Eggert et al., "A Closer Look: Small Object Detection in Faster R-CNN," in Proceedings of the IEEE International Conference on Multimedia and Expo (ICME) 2017, Jul. 10, 2017, 6 pages.

Everingham et al., "The Pascal Visual Object Classes (VOC) Challenge," International Journal of Computer Vision, vol. 88, Sep. 9, 2009, 36 pages.

Hsieh et al., "Focus: Querying Large Video Datasets with Low Latency and Low Cost," in Proceedings of the 13th USENIX Symposium on Operating Systems Design and Implementation, Oct. 8, 2018, 19 pages.

Kang et al., "NoScope: Optimizing Neural Network Queries over Video at Scale," arXiv, Aug. 8, 2017, 12 pages.

Lin et al., "Feature Pyramid Networks for Object Detection," in Proceedings of the IEEE Conference on Computer Vision and Pattern Recognition, 2017, 9 pages.

Oh et al., "A Large-scale Benchmark Dataset for Event Recognition in Surveillance Video," in Proceedings of the IEEE Conference on Computer Vision and Pattern Recognition, 2011, 8 pages.

Tensorflow, "TensorFlow 2 Detection Model Zoo," retrieved from https://github.com/tensorflow/models/blob/master/research/object_detection/g3doc/tf2_detection_zoo.md on Jun. 3, 2025, 3 pages.

Zeng et al., "Combining Background Subtraction Algorithms with Convolutional Neural Network," arXiv, Jul. 9, 2018, 7 pages.

* cited by examiner

APPARATUS, ARTICLES OF MANUFACTURE, AND METHODS TO PARTITION NEURAL NETWORKS FOR EXECUTION AT DISTRIBUTED EDGE NODES

FIELD OF THE DISCLOSURE

This disclosure relates generally to Edge networks and, more particularly, to apparatus, articles of manufacture, and methods to partition neural networks for execution at distributed Edge nodes.

BACKGROUND

Edge computing provides improved cloud computing services by moving computation and data storage closer to the sources of data. Instead of an Edge device or an Internet of Things (IoT) device transmitting data and offloading computations to a cloud data center, an Edge network uses base stations (e.g., Edge compute nodes) deployed closer to endpoint devices that can offer the same functionality of the cloud data center but on a smaller scale. By providing Edge nodes closer to the edge devices, the edge service offers much lower latency than if the device were to communicate with the cloud data center. In other words, the time it takes to begin a data transfer or computation at the Edge node is much shorter than it would take to perform the same operations at the cloud data center. Therefore, Edge services that rely on cloud storage or computation and also require low latency to accomplish tasks must employ edge computing to function properly.

DETAILED DESCRIPTION

Figure 1:
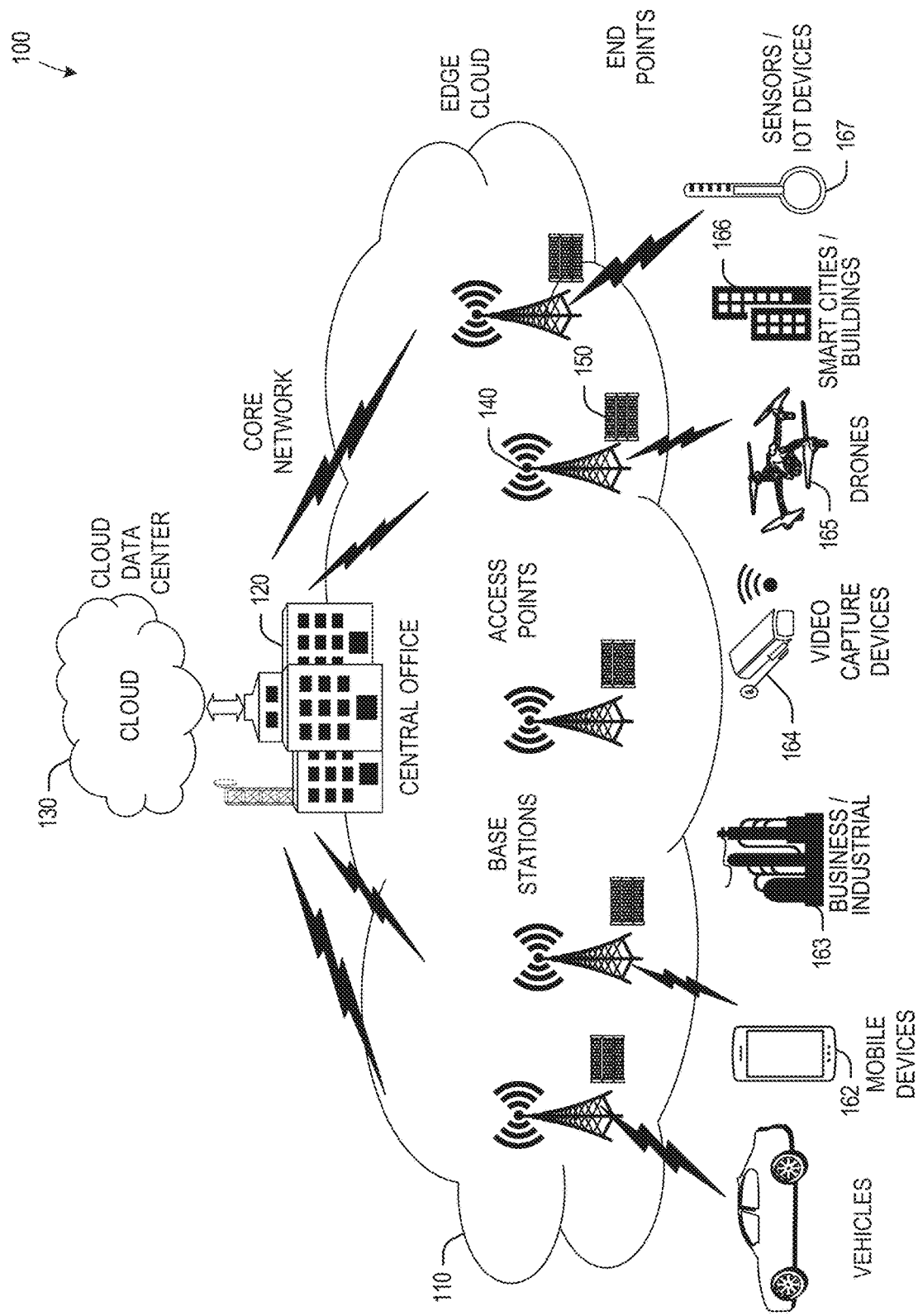
FIG. 1 illustrates an overview of an Edge cloud configuration for Edge computing.

In general, the same reference numbers will be used throughout the drawing(s) and accompanying written description to refer to the same or like parts. The figures are not to scale.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Artificial neural networks can be trained to input a layer of data, execute multiple layers of computations, and generate a reliable output. In some examples, a neural network model (e.g., an artificial neural network) can be executed on an Edge node (e.g., Edge device, Edge base station, etc.) to receive an input layer of image data (e.g., pixel data), compute the image data over multiple convolution layers and pooling layers, and output a predictive result based on the training data used to train the neural network model. For example, an Edge device with a camera can capture an image of an intersection of two roads. The example Edge device can execute an example neural network model trained to accept the image as an input layer and estimate the number of vehicles at one junction of the intersection at a confidence level that is at or above a threshold (e.g., 95%, 98%, sufficiently near 100%, etc.). In some examples, the neural network model processes the input image data in one or more convolution layers to keep certain features of the image that are important for the inferencing. In between the example convolution layers are example pooling layers which intensify the image data kept by the convolution layers and discard the unnecessary information. The example neural network model includes an input layer, a series of hidden layers that resemble a pattern of convolution layer followed by pooling layer, continuing until the output layer results in a prediction (e.g., inference about the number of vehicles at the intersection).

In some examples, the neural network model as described above is executed on a sustainably-powered Edge node that includes the camera generating image data. In examples disclosed herein, "sustainably-powered Edge node" refers to an Edge node (e.g., an Edge device, an Edge base station, etc.) that relies on source(s) of renewable energy (e.g., solar, wind, etc.) for charging a power source (e.g., a battery) that powers the Edge node. In some instances, power allocation is selective and limited for sustainably-powered Edge nodes that execute multiple neural network models simultaneously. In some examples, the amount of energy that is available (e.g., stored on a battery subsystem), the amount of battery life expended to execute the neural network, and/or the rate at which energy can be replenished (e.g., by a renewable energy infrastructure) is dependent on ambient conditions surrounding the example Edge node (e.g., irradiance, wind speed, humidity, etc.). Examples disclosed herein allow Edge nodes (e.g., Edge devices, Edge base stations, access points, Edge aggregation nodes, etc.) to execute more neural network models at a greater rate than existing methods and/or to execute the same number of neural network models with less energy consumption than existing example methods and/or apparatus.

In some examples, the Edge node generates example image data and executes the neural network model to process input image data according to an example platform service. In examples disclosed herein, a "platform service" refers to a type of computation and/or operation that corresponds to a specific utility such as vehicle safety, traffic regulation, facial recognition, etc., and is to return a result within a predefined service level agreement (SLA) timeframe. The example SLA timeframe can be a standard set by a third party organization, committee, governmental arm, etc. For example, the Edge node may count the number of vehicles in a generated image for traffic prediction implementations, which may have an SLA timeframe of 1000 milliseconds (ms). In other examples, the Edge node may determine positional and directional information of vehicles heading eastbound based on captured image data and distribute the results to automated vehicles heading westbound. In this example, the safety platform service for automated driving vehicles may have an SLA timeframe of 20 ms to account for a safety factor.

In some examples, a sustainably-powered Edge node generating data for processing by a neural network model may not be able to execute the entire neural network within a predefined power threshold (e.g. power constraint) due to the ambient conditions and/or the estimated power consumption for executing the neural network model. Additionally and/or alternatively, the example Edge node may or may not be able to execute the entire neural network model within an SLA timeframe due to the platform service constraints associated with the initial processing request. In examples disclosed herein, an example first Edge node (e.g., sustainably-powered Edge node, Edge device, Edge base station, etc.) can execute one or more neural network partitioning models to divide a neural network model into a first portion of layers to be executed on the first Edge node and a second portion of layers to be executed on a second Edge node. In the examples disclosed herein, the first "portion" and/or the second "portion" can include one or more layers of the neural network model that is being partitioned (e.g., divided, segmented, separated, etc.). The example neural network partitioning models can determine the first portion of layers based on ambient conditions, an estimated energy the first Edge node consumes by executing the full neural network model and/or the first portion, and an SLA timeframe of a platform service being performed. In some examples, the second Edge node is an Edge device, an Edge base station, an Edge aggregation node, cloud data center etc. that is at a higher level of aggregation than the first Edge node. For example, the second Edge node may be physically closer to the cloud data center than the first Edge node, have greater processing power and compute resources than the first Edge node, and have larger memory and data stores on site.

In examples disclosed herein, the first Edge node receives a request from a device (e.g., Internet of Things (IoT) device, endpoint device, etc.) to input a data set to a neural network model, compute the result on the first Edge node, and output the result back to the device. The first example Edge node uses telemetry sensor data as input layers for one or more trained neural network partitioning models. In some examples, the first Edge node is connected to telemetry sensors that gather ambient data (e.g., temperature data, irradiance data, wind data, humidity data, etc.) used to estimate (e.g., infer, determine, calculate, etc.) the power consumption for executing the neural network model associated with the example IoT device's request. In some examples, the first Edge node includes power management circuitry that generates energy data indicating the amount of energy currently left in a battery subsystem on the first Edge node. In other examples, the amount of energy currently available is provided directly from the battery subsystem. In some examples, network bandwidth telemetry data is collected to determine how much bandwidth is currently available for transmitting data from the first Edge node to the second Edge node (or a third Edge node). The example network bandwidth can be used to determine the transmission time for sending intermediate data from the first Edge node to the second Edge node and/or for sending final data from the second Edge node to the first Edge node.

In examples disclosed herein, neural network partitioning circuitry executes trained neural network partitioning models on the first Edge node to determine a first portion and a second portion of the neural network model based on the input information mentioned above. The example processing circuitry on the first Edge node executes the neural network model and stops the execution after a final layer of the first portion and/or before an initial layer of the second portion. The example processing circuitry can consolidate the outputs from the multiple neurons of the final layer of the first portion into an intermediate result (e.g., output, computation, calculation, determination, etc.). In some examples, a payload (e.g., the intermediate result, a first identifier, and/or a second identifier) is stored in memory on the first Edge node. In some examples, the first identifier and the second identifier are universally unique identifiers. The example first identifier indicates the input data being processed such that the device (e.g., IoT device, endpoint device, etc.) can associate the received output result with the original request and/or input data. The example second identifier indicates the neural network being executed on the first Edge node such that the second Edge node can execute the second portion of the same neural network. In some examples, the second identifier also indicates the layer of the neural network at which the first portion ends, and/or the second portion begins.

In examples disclosed herein, the first portion is determined based on the processing circuitry estimating the power needed to compute the neural network layers on the first Edge node (e.g., computation energy consumption) and estimating the power needed to transmit the intermediate results generated by the neural network layers (e.g., transmission energy consumption). For instance, the first Edge node may be located in an Arctic region where the surrounding temperature is −20 degrees Fahrenheit. For some battery subsystems operating at these example temperatures, battery life and battery voltage are diminished relative to operating in moderate conditions. In such examples, the processor circuitry may also estimate (e.g., infer, determine, calculate, etc.) that the power consumption for processing the neural network model and/or the first portion will exceed the available battery power supply, given the low temperatures. In other examples, the power used to compute the neural network model and/or the first portion (e.g., computation energy consumption) may be within the available batter power supply but not within a decided (e.g., predetermined and/or dynamically determined) power usage threshold. In other examples, the processor circuitry can use the neural network partitioning model(s), the ambient data, and/or network telemetry data to estimate how much power would be used to send the first identifier, the second identifier, and/or the intermediate results that would be generated by each of the layers (e.g., transmission energy consumption) to the second Edge node. For cases in which the sum of the estimated computation energy consumption and the transmission energy consumption is above the available battery supply power or above the decided energy consumption threshold (e.g., power usage limit), the example processor circuitry determines that the first portion is too large and will adjust the number of layers in the first portion accordingly.

In examples disclosed herein, the processor circuitry on the first Edge node determines the first portion based on the time it would take to transmit the first identifier, the second identifier, and/or the intermediate result of the neural network model layers (e.g., transmission time). In some examples, the processor circuitry uses network bandwidth telemetry data to determine how much bandwidth is currently available for transmitting data between the first Edge node and the second Edge node. For example, the processor circuitry may determine that there is 400 Megabits per second (Mbps) network bandwidth available and 100 Mb of data to transmit. In such examples, the processor circuitry determines that the transmission time will be 250 milliseconds (ms). In some examples, the processor circuitry can similarly determine the transmission time for sending a final result (e.g., determination, computation, calculation, etc.) back to the first Edge node and ultimately the example device (e.g., IoT device, endpoint device, etc.). In some examples, the processor circuitry can determine if a total transmission time is within the SLA timeframe for the platform service being performed. If the example total transmission time is above the SLA timeframe, then the processor circuitry adjusts the first portion and the second portion. In other examples, if the example total transmission time is above the SLA timeframe for the possible first portion sizes, then the processor circuitry will determine the total transmission time for sending the first identifier, the second identifier, and/or the intermediate result (e.g., the payload with a payload size) from the first Edge node to a third Edge node.

FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
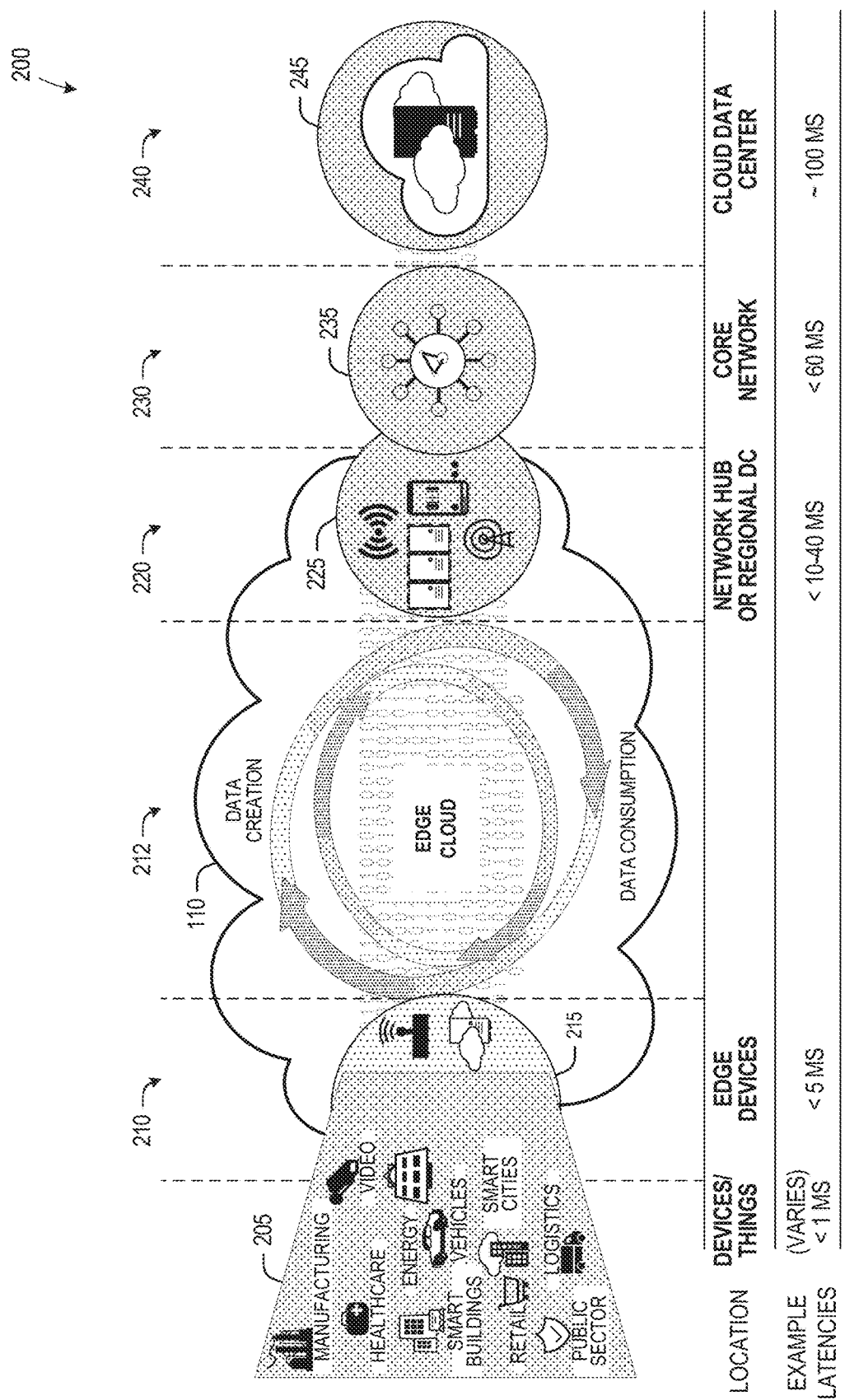
FIG. 2 illustrates operational layers among endpoints, an Edge cloud, and cloud computing environments.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The Edge cloud 110 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
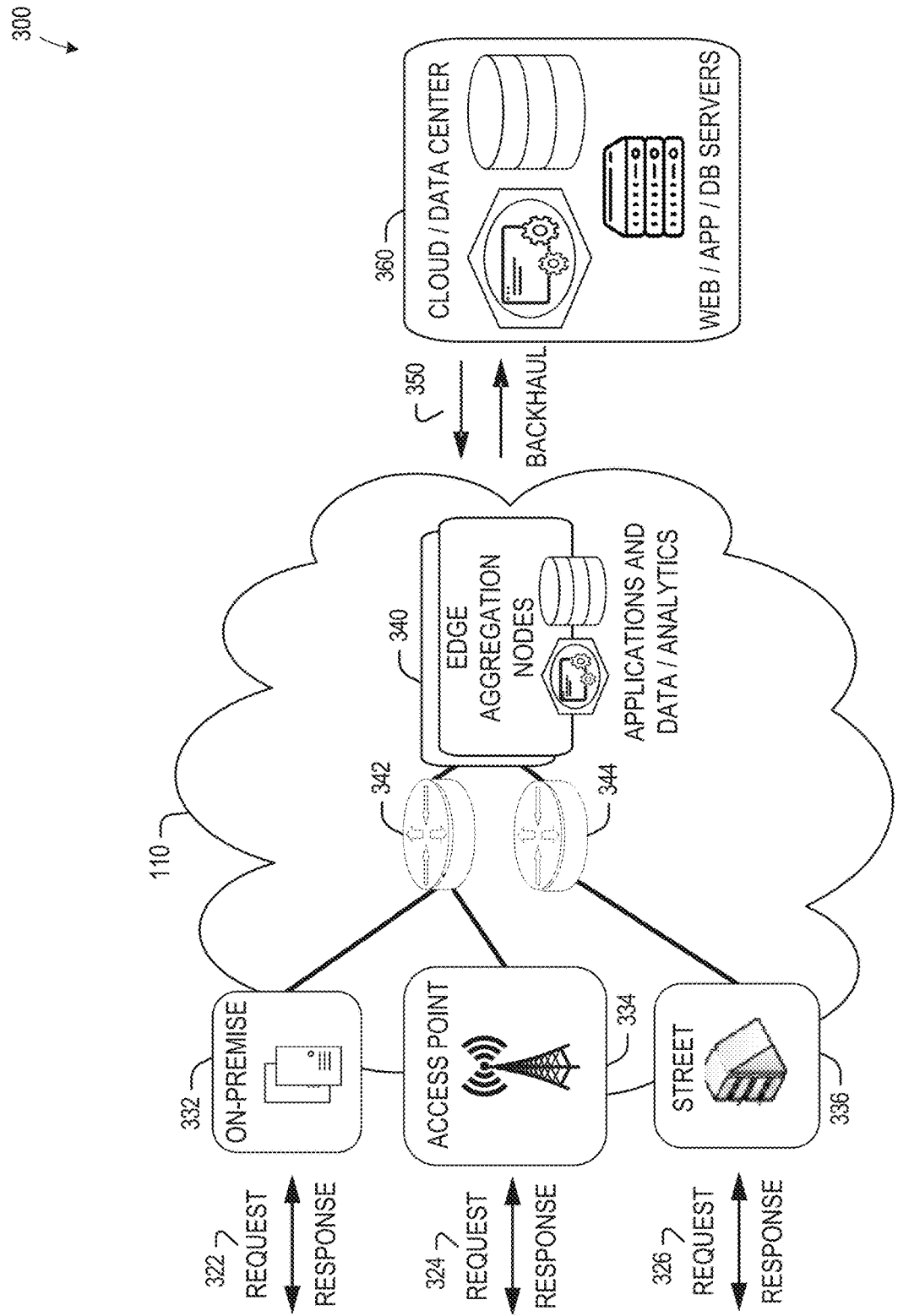
FIG. 3 illustrates an example approach for networking and services in an Edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., a cellular network tower). Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center 360, which uses a backhaul network 350 to fulfill higher-latency requests from a cloud/data center for websites, applications, database servers, etc. Additional or consolidated instances of the Edge aggregation nodes 340 and the aggregation points 342, 344, including those deployed on a single server framework, may also be present within the Edge cloud 110 or other areas of the TSP infrastructure.

Figure 4:
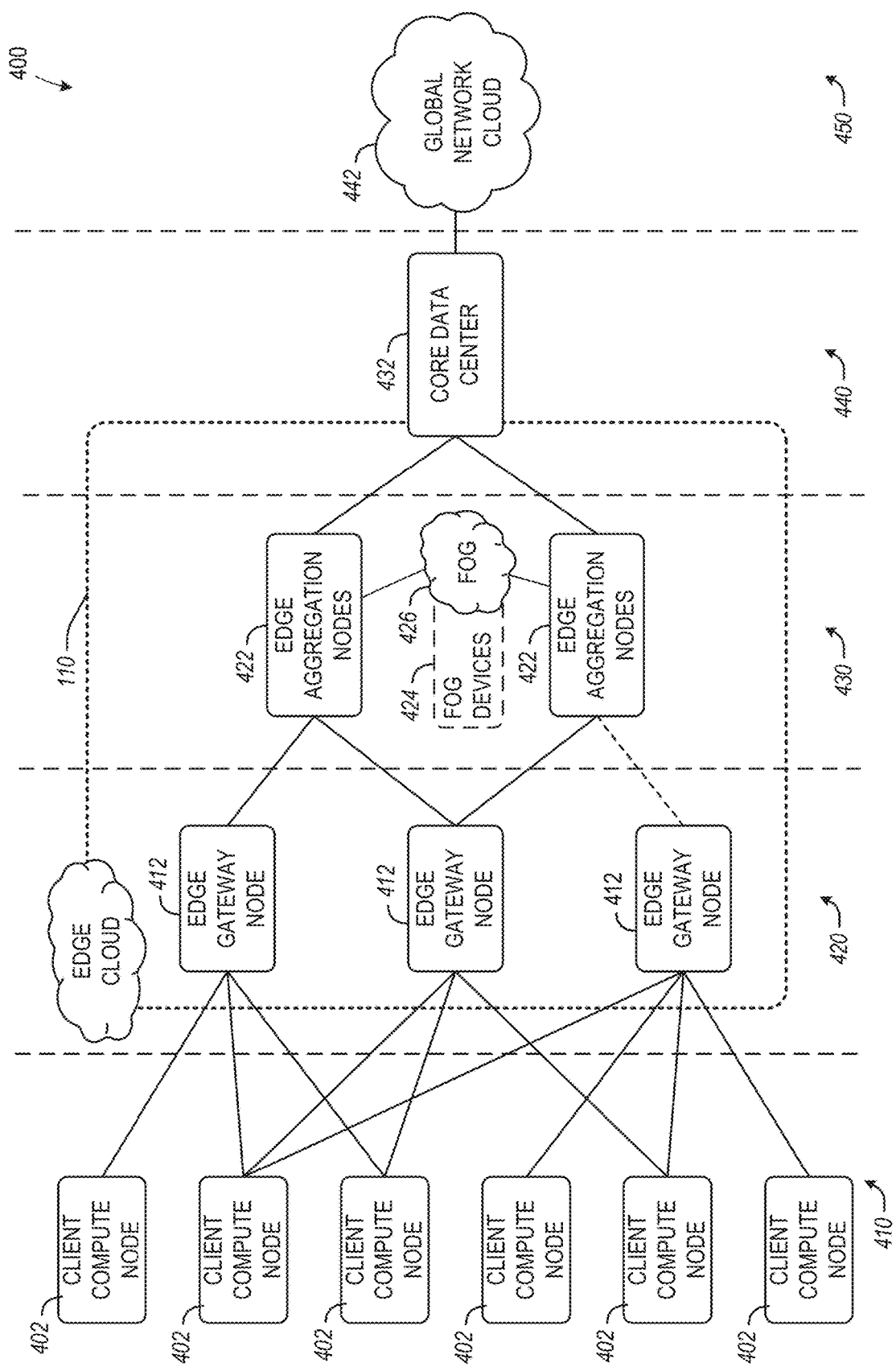
FIG. 4 illustrates an overview of layers of distributed compute deployed among an Edge computing system, according to an example.

FIG. 4 generically depicts an Edge computing system for providing Edge services and applications to multi-stakeholder entities, as distributed among one or more client compute nodes 402, one or more Edge gateway nodes 412, one or more Edge aggregation nodes 422, one or more core data centers 432, and a global network cloud, as distributed across layers of the network. The implementation of the Edge computing system may be provided at or on behalf of a telecommunication service provider ("telco", or "TSP"), internet-of-things service provider, cloud service provider (CSP), enterprise entity, or any other number of entities.

Each node or device of the Edge computing system is located at a particular layer corresponding to layers 410, 420, 430, 440, 450. For example, the client compute nodes 402 are each located at an endpoint layer 410, while each of the Edge gateway nodes 412 are located at an Edge devices layer 420 (local level) of the Edge computing system. Additionally, each of the Edge aggregation nodes 422 (and/or fog devices 424, if arranged or operated with or among a fog networking configuration 426) are located at a network access layer 430 (an intermediate level). Fog computing (or "fogging") generally refers to extensions of cloud computing to the Edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with Edge computing as discussed herein; many of the Edge computing aspects discussed herein are applicable to fog networks, fogging, and fog configurations. Further, aspects of the Edge computing systems discussed herein may be configured as a fog, or aspects of a fog may be integrated into an Edge computing architecture.

The core data center 432 is located at a core network layer 440 (e.g., a regional or geographically-central level), while the global network cloud 442 is located at a cloud data center layer 450 (e.g., a national or global layer). The use of "core" is provided as a term for a centralized network location—deeper in the network—which is accessible by multiple Edge nodes or components; however, a "core" does not necessarily designate the "center" or the deepest location of the network. Accordingly, the core data center 432 may be located within, at, or near the Edge cloud 110.

Although an illustrative number of client compute nodes, Edge gateway nodes 412, Edge aggregation nodes 422, core data centers 432, global network clouds 442 are shown in FIG. 4, it should be appreciated that the Edge computing system may include more or fewer devices or systems at each layer. Additionally, as shown in FIG. 4, the number of components of each layer 410, 420, 430, 440, 450 generally increases at each lower level (i.e., when moving closer to endpoints). As such, one Edge gateway node 412 may service multiple client compute nodes 402, and one Edge aggregation node 422 may service multiple Edge gateway nodes 412.

Consistent with the examples provided herein, each client compute node 402 may be embodied as any type of end point component, device, appliance, or "thing" capable of communicating as a producer or consumer of data. Further, the label "node" or "device" as used in the Edge computing system 400 does not necessarily mean that such node or device operates in a client or agent/minion/follower role; rather, any of the nodes or devices in the Edge computing system 400 refer to individual entities, nodes, or subsystems which include discrete or connected hardware or software configurations to facilitate or use the Edge cloud 110.

As such, the Edge cloud 110 is formed from network components and functional features operated by and within the Edge gateway nodes 412 and the Edge aggregation nodes 422 of layers 420, 430, respectively. The Edge cloud 110 may be embodied as any type of network that provides Edge computing and/or storage resources which are proximately located to radio access network (RAN) capable endpoint devices (e.g., mobile computing devices, IoT devices, smart devices, etc.), which are shown in FIG. 4 as the client compute nodes 402. In other words, the Edge cloud 110 may be envisioned as an "Edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the Edge cloud 110 may form a portion of or otherwise provide an ingress point into or across a fog networking configuration 426 (e.g., a network of fog devices 424, not shown in detail), which may be embodied as a system-level horizontal and distributed architecture that distributes resources and services to perform a specific function. For instance, a coordinated and distributed network of fog devices 424 may perform computing, storage, control, or networking aspects in the context of an IoT system arrangement. Other networked, aggregated, and distributed functions may exist in the Edge cloud 110 between the cloud data center layer 450 and the client endpoints (e.g., client compute nodes 402). Some of these are discussed in the following sections in the context of network functions or service virtualization, including the use of virtual Edges and virtual services which are orchestrated for multiple stakeholders.

The Edge gateway nodes 412 and the Edge aggregation nodes 422 cooperate to provide various Edge services and security to the client compute nodes 402. Furthermore, because each client compute node 402 may be stationary or mobile, each Edge gateway node 412 may cooperate with other Edge gateway devices to propagate presently provided Edge services and security as the corresponding client compute node 402 moves about a region. To do so, each of the Edge gateway nodes 412 and/or Edge aggregation nodes 422 may support multiple tenancy and multiple stakeholder configurations, in which services from (or hosted for) multiple service providers and multiple consumers may be supported and coordinated across a single or multiple compute devices.

Figure 5:
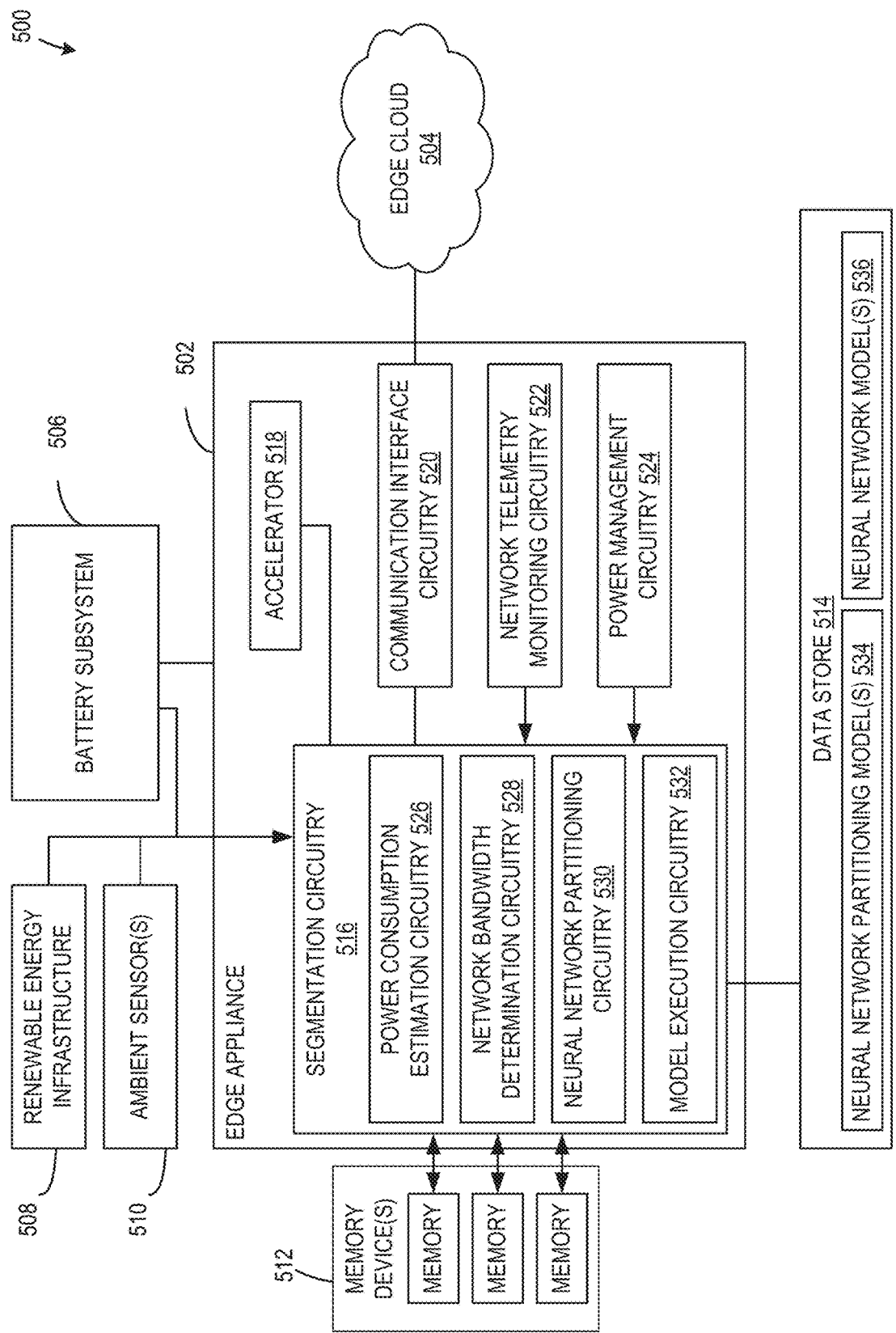
FIG. 5 is a block diagram of an example neural network partitioning system in accordance with examples disclosed herein.

FIG. 5 is a block diagram of an example neural network partitioning system 500 to separate (e.g., partition, divide, segment, etc.) one or more layers of an example neural network model into a first portion to be executed on an example first Edge node and a second portion to be executed on an example second Edge node or an example third Edge node. The example neural network partitioning system 500 of FIG. 5 may be instantiated (e.g., creating an instance of, bring into being for any length of time, materialize, implement, etc.) by processor circuitry such as a central processing unit executing instructions. Additionally or alternatively, the example neural network partitioning system 500 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by one or more virtual machines and/or containers executing on the microprocessor.

The example neural network partitioning system 500 illustrated in FIG. 5 includes an example Edge appliance 502 (e.g., Edge node, Edge device, Edge base station, etc.), an example Edge cloud 504, an example battery subsystem 506, an example renewable energy infrastructure 508, example ambient sensor(s) 510, example memory device(s) 512, and an example data store 514. The Edge appliance 502 is a sustainably-powered Edge node that communicates with other Edge node(s) (e.g., Edge device(s), Edge base station(s), etc.) in the Edge cloud 504 illustrated in FIG. 5.

In some examples, the Edge appliance 502 is the first Edge node that executes the first portion of the neural network model. In some examples, the Edge appliance 502 is the second Edge node or third Edge node that executes the second portion of the neural network model. In some examples, the Edge cloud 504 may be implemented by the Edge cloud 110 as described above.

The example Edge appliance 502 illustrated in FIG. 5 includes example segmentation circuitry 516, an example accelerator 518, example communication interface circuitry 520, example network telemetry monitoring circuitry 522, and example power management circuitry 524. The example segmentation circuitry 516 of the illustrated example includes example power consumption estimation circuitry 526, example network bandwidth determination circuitry 528, example neural network partitioning circuitry 530, and example model execution circuitry 532. The example data store 514 illustrated in FIG. 5 includes example neural network partitioning model(s) 534 and example neural network model(s) 536.

In some examples, the battery subsystem 506 illustrated in FIG. 5 is an electronic system that manages and/or includes a rechargeable power source (e.g., a battery, one or more battery cells, a battery pack, etc.). The example battery subsystem 506 can prevent the power source from exceeding a safety operation standard, monitor the power available to the Edge appliance 502 from the battery subsystem 506, meter the rate of power draining from the battery subsystem 506, etc. In some examples, the battery subsystem 506 is connected and/or otherwise coupled to the Edge appliance 502 for transmitting electrical energy and/or secondary data (e.g., the state of available battery power, lifecycle time of the battery, etc.) to the Edge appliance 502 and/or the segmentation circuitry 516.

The example neural network partitioning system 500 illustrated in FIG. 5 includes renewable energy infrastructure 508 for gathering electronic energy from sustainable (e.g., renewable) resources (e.g., solar, wind, etc.). For example, the renewable energy infrastructure 508 can include solar panels, wind turbines, etc., and/or associated hardware (e.g., circuitry), software, and/or firmware. The renewable energy infrastructure 508 is connected and/or otherwise coupled to the battery subsystem 506 for supplying electrical energy for storage on the battery subsystem 506. The energy that the renewable energy infrastructure 508 supplies and stores on the battery subsystem 506 is used to power the Edge appliance 502. The example renewable energy infrastructure 508 is also connected to the segmentation circuitry 516 and can supply energy and/or energy information to the segmentation circuitry 516 and/or the Edge appliance 502 as an input to the neural network partitioning model(s) 534 described below.

In some examples, the ambient sensor(s) 510 illustrated in FIG. 5 monitor the ambient conditions surrounding the Edge appliance 502. For example, the ambient sensor(s) 510 can include a thermocouple for measuring the temperature of the ambient air, a hygrometer for measuring the humidity of the ambient air, an anemometer for measuring the wind speed of the ambient air, etc. In some examples, the ambient sensor(s) 510 is/are connected to the segmentation circuitry 516 and/or the Edge appliance 502 to supply ambient data as an input to the neural network partitioning model(s) 534 described below. Further example implementations of the Edge appliance 502, the battery subsystem 506, the renewable energy infrastructure 508, and the ambient sensor(s) 510 are described below.

The example neural network partitioning system 500 illustrated in FIG. 5 includes the memory device(s) 512 connected to the segmentation circuitry 516 and/or the Edge appliance 502. In some examples, the memory device(s) 512 can be implemented using volatile memory device(s) such as dynamic random access memory, static random access memory, dual in-line memory module, etc. The illustrated example of FIG. 5 depicts three memory devices included in the cluster of memory device(s) 512, however, there may be a fewer or greater number of memory devices included in the example neural network partitioning system 500. Additionally and/or alternatively, the Edge appliance 502 may include one(s) of the memory device(s) 512. In some examples, the memory device(s) 512 are used to temporarily store an intermediate result (e.g., output, computation, calculation, determination, etc.), the intermediate result being obtained from executing a first portion of neural network model(s) 536. In some examples, the memory devices(s) 512 also store a first identifier (e.g., universally unique identifier) indicating input data received from the device (e.g., IoT device, endpoint device, etc.). In some examples, the memory device(s) 512 also store a second identifier (e.g., universally unique identifier) indicating the neural network model(s) 536 being executed. In some examples, the second identifier also indicates the final layer of the first potion and/or the initial layer of the second portion. In some examples, the model execution circuitry 532 stores a payload (e.g., the intermediate result, the first identifier, and/or the second identifier) in the memory device(s) 512 and/or the data store 514.

The example data store 514 illustrated in FIG. 5 is connected to the example segmentation circuitry 516 and/or the Edge appliance 502. In some examples, the data store 514 can be implemented using non-volatile memory that stores the neural network partitioning model(s) 534 and the neural network models 536. The example data store 514 can be external to the Edge appliance 502 as illustrated in FIG. 5 or can be included in the Edge appliance 502.

The example Edge appliance 502 includes example segmentation circuitry 516 that executes the neural network partitioning model(s) 534 and/or the neural network model(s) 536 stored on the data store 514. The example neural network partitioning model(s) 534 are neural network models trained to determine what layers of a neural network model 536 (e.g., neural network model used for processing input data for a particular platform service) to include in a first portion to be executed on a first Edge node and a second portion to be executed on a second Edge node. In some examples, the segmentation circuitry 516 relies on input data from the battery subsystem 506, the ambient sensor(s) 510, network telemetry monitoring circuitry 522, and the power management circuitry 524. In some examples, the segmentation circuitry 516 executes the neural network partitioning model(s) 534, the neural network model(s) 536, and/or portion(s) of the neural network model(s) 536. In some examples, the segmentation circuitry 516 outputs the first identifier (e.g., a universally unique identifier (UUID)) of input data, the second identifier of the neural network model(s) 536 being executed, and/or the intermediate result obtained from executing the first portion of neural network model(s) 536. In other examples, the segmentation circuitry 516 outputs the first identifier (e.g., universally unique identifier) of input data, the second identifier of the neural network model(s) 536 being executed, and/or a final result obtained from executing the second portion of neural network model(s) 536 and/or from executing the full neural network model(s) 536.

In some examples, the Edge appliance 502 includes an accelerator 518 to decrease the processing time at which the segmentation circuitry 516 executes the neural network partitioning model(s) 534 and/or the neural network model(s) 536. The example accelerator 518 can be external to or integrated on the Edge appliance 502. For example, the Edge appliance 502 can be implemented as a System on a chip (SoC) that includes the segmentation circuitry 516, the accelerator 518, the 520, the 522, and/or the 524 on the same semiconductor substrate. Additionally or alternatively, a smart network interface controller (SmartNIC), infrastructure processing unit (IPU), a separate computer processing unit (CPU), etc. can be used in conjunction with or in place of the accelerator 518.

In some examples, the Edge appliance 502 includes communication interface circuitry 520 to communicate with other devices (e.g., Edge devices, Internet of Things (IoT) devices, endpoint devices, Edge base stations, Edge aggregation nodes, etc.) for exchanging data. In some examples, the Edge appliance 502 is the first Edge node and transmits the payload (e.g., the intermediate result of the first portion, the first identifier, the second identifier, etc.) to the second or third Edge node via the communication interface circuitry 520. In some examples, the Edge appliance 502 is the first Edge node and receives data (e.g., the final result of the second portion, the first identifier, etc.) from the second or third Edge node via the communication interface circuitry 520. In other examples, the Edge appliance 502 is the second Edge node or third Edge node and transmits data (e.g., the final result of the second portion, the first identifier, etc.) to the first Edge node via the communication interface circuitry 520. In other examples, the Edge appliance 502 is the second Edge node or third Edge node and receives data (e.g., the intermediate result of the first portion, the first identifier, the second identifier, etc.) from the first Edge node via the communication interface circuitry 520.

In some examples, the Edge appliance 502 includes network telemetry monitoring circuitry 522 to assess the available network bandwidth between the Edge appliance 502 and another Edge node (e.g., Edge device, Edge base station, second Edge node, etc.). In some examples, the Edge appliance 502 is the first Edge node (e.g., the client compute node 402) and the network telemetry monitoring circuitry 522 monitors the available network bandwidth between the Edge appliance 502 and the second Edge node (e.g., the Edge gateway node 412, Edge aggregation nodes 422, core data center 432, etc.). The example network telemetry monitoring circuitry 522 can check the network bandwidth that is available between the first Edge node (e.g., the Edge appliance 502, the client compute node 402, etc.) and the second Edge node (e.g., the Edge appliance 502, the Edge gateway node 412, Edge aggregation nodes 422, core data center 432, etc.), the third Edge node (e.g., the Edge appliance 502, the Edge gateway node 412, Edge aggregation nodes 422, core data center 432, etc.), or both the second Edge node and the third Edge node.

In some examples, the Edge appliance 502 includes power management circuitry 524 to control and/or monitor the battery power available to the Edge appliance 502 from the battery subsystem 506. In some examples, the power management circuitry 524 is integrated on the Edge appliance 502, external to the Edge appliance 502, and/or integrated on the battery subsystem 506. The example power management circuitry 524 sends data to the segmentation circuitry 516 indicating the power available to execute the neural network model(s) 536, the first portion, and/or the second portion. In some examples, the power available to execute the neural network model(s) 536, the first portion, and/or the second portion includes the total remaining battery life on the battery subsystem 506 or a share of the remaining battery life on the battery subsystem 506. Determination of the example power available to execute the neural network model(s) 536, the first portion, and/or the second portion (e.g., power consumption threshold) is performed by the power consumption estimation circuitry 526 and explained in further detail below.

The example segmentation circuitry 516 on the Edge appliance 502 illustrated in FIG. 5 includes power consumption estimation circuitry 526. In some examples, the Edge appliance 502 is the first Edge node and the power consumption estimation circuitry 526 assesses the amount of energy that the Edge appliance 502 would consume if the full neural network model(s) 536 were executed or if the first portion of neural network layer(s) were executed. The example power consumption estimation circuitry 526 can execute an artificial intelligence algorithm (e.g., neural network model(s) 536), execute instructions on the Edge appliance 502, refer to a lookup table etc. to estimate (e.g., determine, assess, compute, etc.) the amount of energy the Edge appliance 502 would consume to compute and/or transmit the intermediate result and/or the final result. For example, the lookup table stored on the Edge appliance 502 (e.g., stored in the memory device(s) 512, the data store 514, etc.) can include data, indices, values, etc. that indicate the power the Edge appliance 502 typically consumes when executing particular neural network model(s) 536 given certain ambient conditions (e.g., ambient data including temperature data, wind data, humidity data, etc.).

In some examples, the power consumption estimation circuitry 526 compares the projected power consumption to a power consumption threshold. In some examples, the threshold is predetermined. For example, the example power consumption threshold can be a statically predetermined value established for a particular type of Edge node (e.g., Edge device, Edge base station, client compute node, Edge gateway node, etc.). In some examples, the power consumption threshold is dynamically determined based on the energy output of the renewable energy infrastructure 508, the platform service being performed by the neural network, the life cycle of the battery subsystem 506, the ambient data generated by the ambient sensor(s) 510, etc. In some examples, the power consumption estimation circuitry 526 can execute an artificial intelligence algorithm (e.g., neural network model(s) 536), execute instructions on the Edge appliance 502, refer to a lookup table etc. to determine the power consumption threshold. For example, the lookup table stored on the Edge appliance 502 (e.g., stored in the memory device(s) 512, the data store 514, etc.) can include data, indices, values, etc. that indicate the power consumption threshold/limit the Edge appliance 502 (e.g., the power consumption estimation circuitry 526) should set given certain ambient conditions (e.g., ambient data including temperature data, wind data, humidity data, etc.), the power available in the battery subsystem 506, the neural network model(s) 536 being executed, etc. In other examples, the threshold is dynamically determined by the power management circuitry 524 and/or the power consumption estimation circuitry 526 based on the factors mentioned above or other example variables.

The example segmentation circuitry 516 includes network bandwidth determination circuitry 528 to identify the network bandwidth that is available between the first Edge node and the second Edge node and/or the third Edge node. In some examples, the network bandwidth determination circuitry 528 also calculates the bandwidth required to send the intermediate result, first identifier, and/or second identifier to the second Edge node and/or third Edge node. In some examples, the network bandwidth determination circuitry 528 also calculates a transmission time for sending the intermediate result, the first identifier, and/or the second identifier to the second Edge node and/or the third Edge node. In some examples, the network bandwidth determination circuitry 528 also determines if the transmission time is within a service level agreement (SLA) timeframe.

In some examples, the network bandwidth determination circuitry 528 receives input data from the network telemetry monitoring circuitry 522. For example, the network bandwidth determination circuitry 528 may receive telemetry data indicating that there is 300 Mbps bandwidth available between the first Edge node and the second Edge node and that there is 400 Mbps bandwidth available between the first Edge node and the third Edge node. In such examples, the network bandwidth determination circuitry 528 may determine that the communication interface circuitry 520 will use 450 Mbps of bandwidth to transmit the intermediate result to the second Edge node and/or third Edge node. In such examples, the neural network partitioning circuitry 534 may partition (e.g., segment, divide, separate, etc,) the neural network model 536 into a different first portion. In other examples, the network bandwidth determination circuitry 528 may calculate that the communication interface circuitry 520 will use 200 Mbps bandwidth to transmit the intermediate result to the second Edge node and/or third Edge node. In such cases where the bandwidth used to transmit the intermediate result is below the available bandwidth, the network bandwidth determination circuitry 528 calculates a first transmission time for sending the intermediate result to the second Edge node. The example neural network partitioning circuitry 530 can use the example first transmission time and the SLA timeframe to determine the first portion.

The example segmentation circuitry 516 includes neural network partitioning circuitry 530 to receive input data from battery subsystem 506, the renewable energy infrastructure 508, the ambient sensor(s) 510, the power consumption estimation circuitry 526, the network bandwidth determination circuitry 528, the network telemetry monitoring circuitry 522, and/or the power management circuitry 524 and executes the neural network partitioning model(s) 534 to determine the first portion of the neural network model(s) 536 to be processed at the Edge appliance 502. In some examples, the Edge appliance 502 receives input data from an IoT device and a request to return processed output data. For example, the IoT device may request the Edge appliance to determine the number of sedan-model vehicles at an intersection at a given time. In some examples, the IoT device may send image data of the intersection to the Edge appliance 502. In some examples, the Edge appliance 502 is operating the camera and is performing its own request for computing the result. In some instances, the neural network partitioning circuitry 530 determines, selects, and/or instantiates a neural network model 536 that is trained to recognize and index the sedan-model vehicle(s) present in the image data.

In some examples, the power consumption estimation circuitry 526 executes instructions and/or operations to estimate (e.g., infer, determine, calculate, compute, etc.) the computation energy that the layers of the neural network model 536 will consume to process a final result. The example power consumption estimation circuitry 526 receives ambient data (e.g., temperature, irradiance, wind speed, etc.) from the ambient sensor(s) and available energy information from the power management circuitry 524 and/or the battery subsystem 506. In some examples, the power consumption estimation circuitry 526 may determine that the estimated computation energy consumption for executing the full neural network model 536 satisfies a power consumption threshold. In some examples, for the power consumption estimation to "satisfy" the power consumption threshold, the power consumption estimation is less than or equal to (e.g., at or below) the power consumption threshold. The example power consumption threshold is determined based on the available energy and/or the rate at which the renewable energy infrastructure 508 can replenish power to the battery subsystem 506 within an acceptable timeframe. In such examples, the neural network partitioning circuitry 530 would determine that the first portion is the full neural network model 536, saving time and power by not transmitting data to the second Edge node or the third Edge node.

In some examples, the power consumption estimation circuitry 526 estimates that the battery power consumption for executing the full neural network 536 on the Edge appliance 502 would not satisfy (e.g., be greater than) the power consumption threshold. In such instances, the neural network partitioning circuitry 530 selects a range of hidden layers in the neural network model 536 to execute locally on the Edge appliance (e.g., the first Edge node) based on the estimated computation energy consumption. The example neural network partitioning circuitry 530 then receives data from the network bandwidth determination circuitry 528 indicating the bandwidth the communication interface circuitry 520 will use to transmit intermediate results generated from the layers of the neural network model 536, the available network bandwidth for transmitting an intermediate result to the second Edge node or third Edge node, and/or whether the bandwidth is below the available bandwidth. In some examples, the neural network partitioning circuitry 530 also receives a service level agreement (SLA) timeframe for a given platform service associated with the operation that the IoT device requests and that the neural network model performs. In such examples, the neural network partitioning circuitry 530 determines if the total transmission time satisfies the SLA timeframe. In some examples, for the total transmission time to "satisfy" the SLA timeframe, the total transmission time is less than or equal to (e.g., at or below) the SLA timeframe. In other examples, the network bandwidth determination circuitry 528 makes that determination and passes the determination to the neural network partitioning circuitry 530.

The example neural network partitioning circuitry 530 can execute neural network partitioning model(s) 534 to determine the first portion and/or the second portion. The example neural network partitioning model(s) 534 can be convolutional neural network(s) with multiple convolution and pooling layers described in greater detail below. In some examples, the neural network partitioning model(s) 534 are trained by machine learning models prior to execution. Many different types of machine learning models and/or machine learning architectures exist. In examples disclosed herein, an artificial neural network (ANN) model (e.g., neural network partitioning model(s) 534 and/or neural network model(s) 536) is used. Using an ANN model enables neural network partitioning circuitry 530 to execute neural network partitioning model(s) 534 with a set of input data from other circuitry on the Edge appliance 502 and output a result categorizing which layers of the neural network model 536 to split into the first portion and the second portion. In general, machine learning models/architectures that are suitable to use in the example approaches disclosed herein will be ANNs trained via unsupervised learning. However, other types of machine learning models could additionally or alternatively be used such as supervised learning, reinforcement learning and/or self-learning techniques, etc.

In some instances, the neural network partitioning model(s) 534 are trained prior use using techniques described in greater detail below. The example neural network partitioning circuitry 530 can execute neural network partitioning model(s) 534 to determine the first portion and/or the second portion. In some examples, the neural network partitioning circuitry 530 implements instructions and/or operations stored in memory device(s) 512, data store 514, and/or other memory on the Edge appliance 502 to determine the first portion and the second portion to be executed. The example neural network partitioning model(s) 534 can be convolutional neural network(s) with multiple convolution and pooling layers described in greater detail below. In some instances, the neural network partitioning model(s) 534 are trained prior to operation via machine learning techniques described in greater detail below.

The example segmentation circuitry 516 includes model execution circuitry 532 to execute the first portion and or the second portion of the neural network model(s) on the Edge appliance 502. In some examples, the Edge appliance 502 is the first Edge node, and the model execution circuitry 532 executes the first portion. In other examples, the Edge appliance 502 is the second Edge node or the third Edge node, and the model execution circuitry 532 executes the second portion. The example model execution circuitry 532 can cease neural network processes once the final layer of the first portion is reach in the neural network pipeline, serialize the neuron outputs from the layer into an indexed order, and consolidate the outputs into an intermediate result. The example model execution circuitry 532 stores the intermediate result and a second identifier in memory device(s) 512 for transmission. In some examples, the second identifier is used to indicate the neural network model 536 being executed and/or the final layer of the first portion (i.e., the initial layer of the second portion and/or the layer preceding the initial layer of the second portion).

In some examples, the model execution circuitry 532 is on the second Edge node and/or third Edge node (e.g., the Edge appliance 502). In such instances, the model execution circuitry 532 receives the intermediate result and/or the second identifier from communication interface circuitry 520. The example model execution circuitry 532 executes a neural network model 536 that matches the second identifier and executes the hidden layer corresponding to the serialized intermediate result and/or the second identifier. In some examples, the model execution circuitry 532 deserializer the intermediate result and inputs the individual neuron outputs into the indicated layer of the neural network model 536 on the second Edge node and/or third Edge node. The example model execution circuitry 532 executes the second portion based on the deserialized results and determines a final result of the neural network model 536 to transmit back to the first Edge node and/or back to the originating IoT device. In some examples, the model execution circuitry 532 stores the final result in memory device(s) 512 before sending.

While an example manner of implementing the neural network partitioning system 500 is illustrated in FIG. 5, one or more of the elements, processes, and/or devices illustrated in FIG. 5 may be combined, divided, re-arranged, omitted, eliminated, and/or implemented in any other way. Further, the example segmentation circuitry 516, the example communication interface circuitry 520, the example network telemetry monitoring circuitry 522, the example power management circuitry 524, the example power consumption estimation circuitry 526, the example network bandwidth determination circuitry 528, the example neural network partitioning circuitry 530, the example model execution circuitry 532, and/or, more generally, the example neural network partitioning system 500 of FIG. 5, may be implemented by hardware alone or by hardware in combination with software and/or firmware. Thus, for example, any of the example segmentation circuitry 516, the example communication interface circuitry 520, the example network telemetry monitoring circuitry 522, the example power management circuitry 524, the example power consumption estimation circuitry 526, the example network bandwidth determination circuitry 528, the example neural network partitioning circuitry 530, the example model execution circuitry 532, and/or, more generally, the example neural network partitioning system 500, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example neural network partitioning system 500 of FIG. 5 may include one or more elements, processes, and/or devices in addition to, or instead of, those illustrated in FIG. 5, and/or may include more than one of any or all of the illustrated elements, processes and devices.

Figure 6:
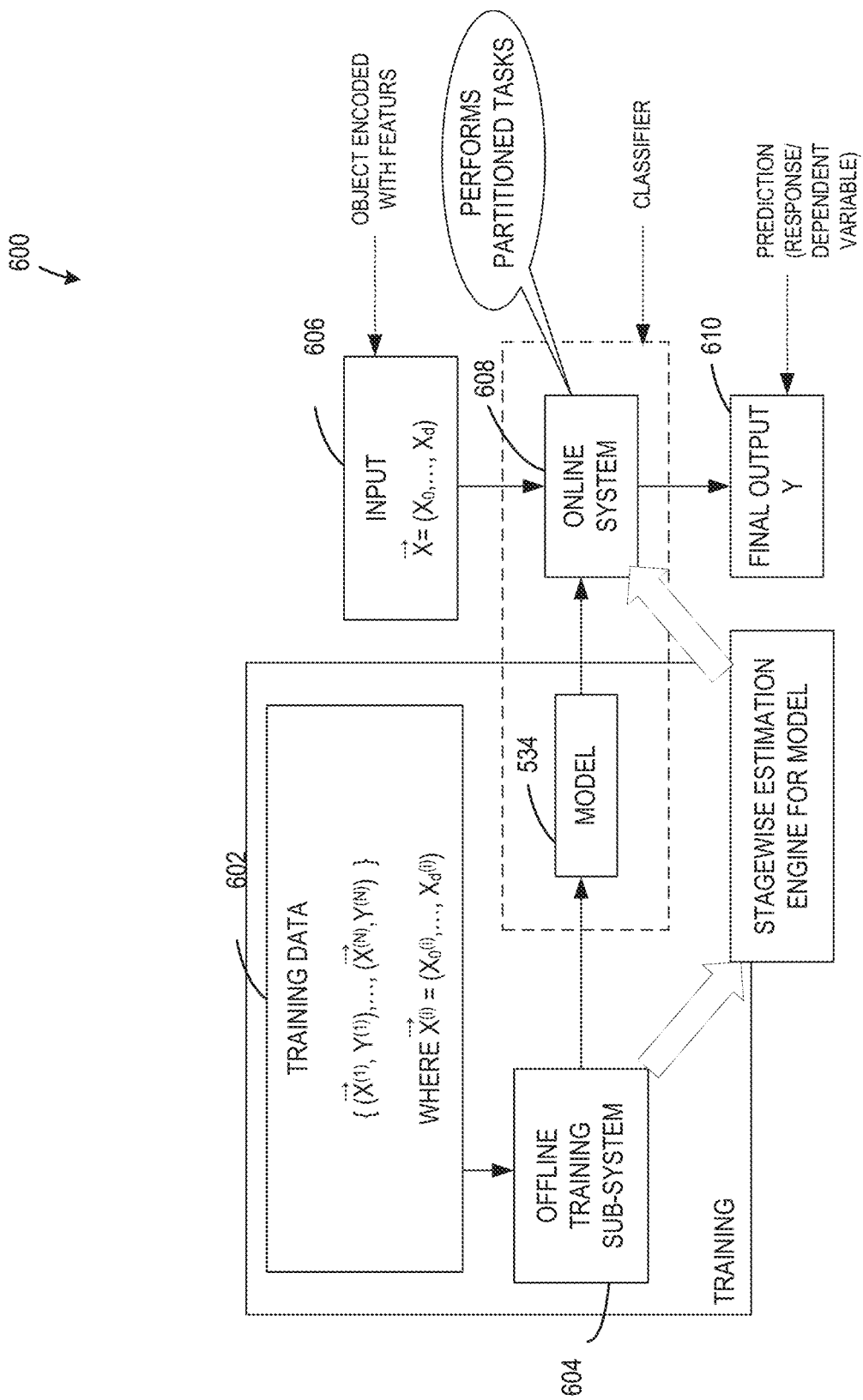
FIG. 6 is a block diagram of an example machine learning system used to train neural network partitioning model(s) executed on the example neural network partitioning system of FIG. 5.

FIG. 6 is a block diagram illustration of an example machine learning process 600 for training example neural network partitioning model(s) 534 of FIG. 5. In some examples, an offline training sub-system 604 uses training data 602 to train the neural network partitioning model(s) 534 how to accurately separate a neural network model 536 into a first portion executed on a first Edge node (e.g., Edge appliance 502 of FIG. 5) and a second portion executed on a second Edge node or third Edge node (e.g., Edge appliance 502 of FIG. 5). The example trained neural network partitioning model(s) 534 performs computations on input data 606 received from a device (e.g., IoT device, Edge device, client compute node, etc.) via an online system 608 (e.g., Edge appliance 502, Edge base station, Edge aggregation node, etc.) connected to an Edge cloud network (e.g., 504). The example neural network partitioning model(s) 534 is executed by the example online system 608 to provide a final output 610 to return back to the device that sent the initial computation request. Further descriptions of machine learning are described below.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, an artificial neural network (ANN) model (e.g., the neural network partitioning model(s) 534 and/or the neural network model(s) 536) is used. Using an ANN model enables the neural network partitioning circuitry 530 to execute the neural network partitioning model(s) 534 with a set of input data from other circuitry on the Edge appliance 502 and output a result indicating which layers of the neural network model 536 to split into the first portion and the second portion. In general, machine learning models/architectures that are suitable to use in the example approaches disclosed herein will be ANNs trained via unsupervised learning. However, other types of machine learning models could additionally or alternatively be used such as supervised learning, reinforcement learning and/or self-learning techniques, etc.

In general, implementing a ML/AI system involves two phases, a learning/training phase, and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, unsupervised training (e.g., used in deep learning, a subset of machine learning, etc.) involves inferring patterns from inputs to select parameters for the ML/AI model (e.g., without the benefit of expected (e.g., labeled) outputs). Alternatively, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.).

In examples disclosed herein, ML/AI models are trained using stochastic gradient descent and/or unsupervised learning. However, any other training algorithm may additionally or alternatively be used. In examples disclosed herein, training is performed until an acceptable amount of error is achieved for selecting the layers to include in the first portion given the neural network model 536 being partitioned. In examples disclosed herein, training is performed at a location offline from the Edge cloud network (e.g., via the offline training sub-system 604) or on the Edge appliance 502. Training is performed using hyperparameters that control how the learning is performed (e.g., a learning rate, a number of layers to be used in the machine learning model, etc.). In examples disclosed herein, hyperparameters that control the number of layers to be used in the machine learning model may be implemented. Such hyperparameters are selected by, for example, manual selection based on the training resources available.

Training is performed using training data. In examples disclosed herein, the training data originates from locally generated data specific to recognizing inputs (e.g., computation energy consumption, transmission energy consumption, total transmission time, etc.) and generating neural network layer clustering outputs (e.g., the first portion). In some examples where supervised training is used, the training data is labeled. Labeling is applied to the training data by an operator and/or programmer. In some examples, the training data is sub-divided into categories corresponding to power consumption and transmission time.

Once training is complete, the model is deployed for use as an executable construct that processes an input and provides an output based on the network of nodes and connections defined in the model. The model is stored at the data store 514 on the Edge appliance 502. The model may then be executed by the neural network partitioning circuitry 530. In some examples, the Edge appliance 502 uses other hardware and/or circuitry to execute the model 534.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 7:
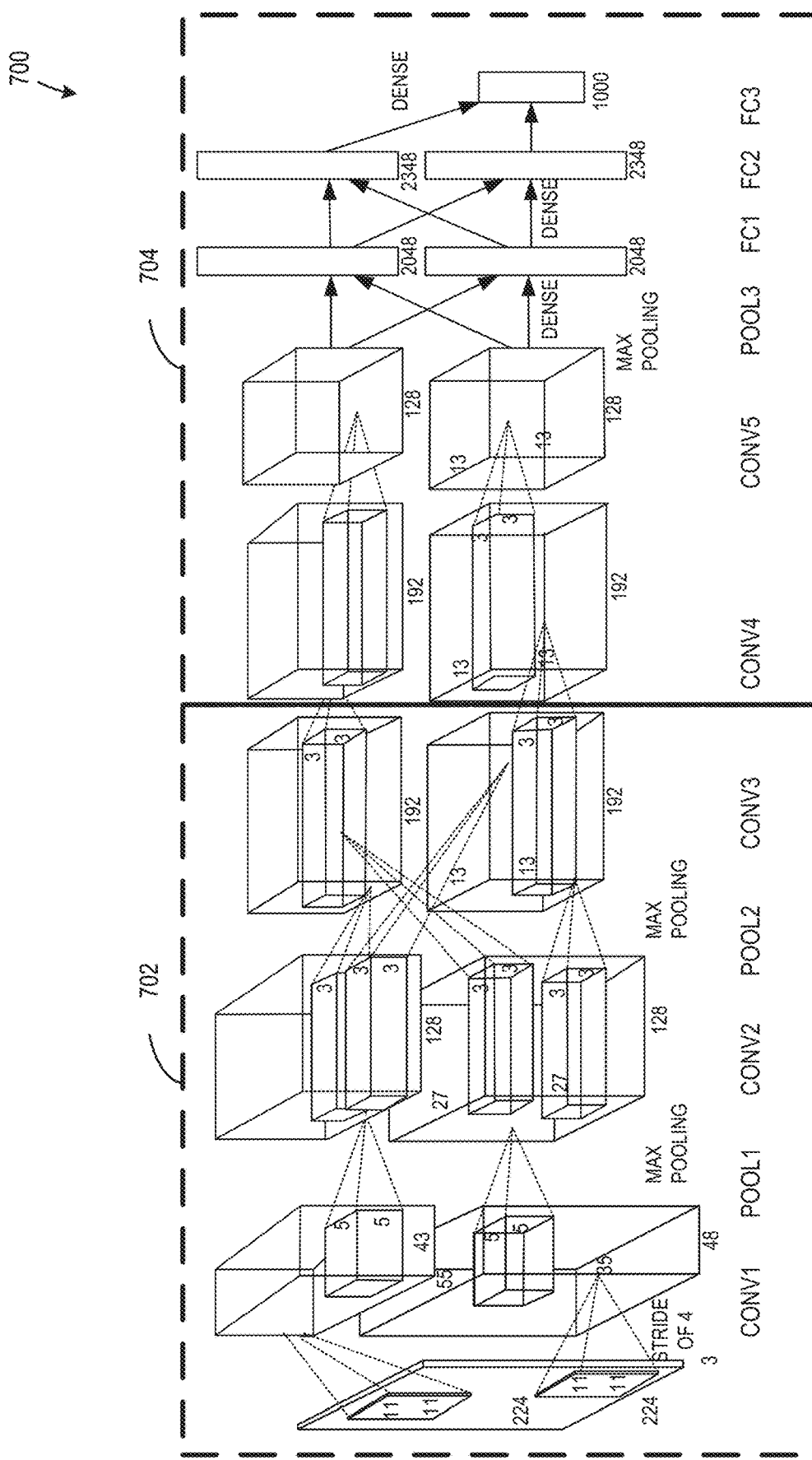
FIG. 7 is an illustration of an example neural network model with multiple layers that can be separated by the example neural network partitioning system of FIG. 5 for execution on distributed Edge nodes.

FIG. 7 is an illustration of an example neural network model 700 that is executed on the Edge appliance 502 and partitioned by the neural network partitioning model(s) 534. In some examples, the neural network model 700 can implement one of the neural network model(s) 536 stored in the data store 514 on the Edge appliance 502 of FIG. 5. The example illustrated neural network model 700 is a convolutional neural network (CNN) with multiple convolution layers (identified by CONV1, CONV2, CONV3, etc.) and pooling layers (identified by POOL1, POOL2, etc.). In some examples, the neural network model 700 is trained via unsupervised learning to make inferences about image data generated by a camera on an IoT device.

In some examples, the neural network partitioning circuitry 530 of FIG. 5 can execute neural network partitioning model(s) 534 of FIG. 5 to split the neural network model 700 into a first portion 702 and second portion 704. For example, the neural network partitioning circuitry 530 can determine that to meet the SLA timeframe and/or the energy consumption threshold, the first portion should terminate after the CONV3 layer. In such examples, the model execution circuitry 532 executes the first portion of the neural network model 700, combines the results of the neurons of the CONV3 layer into a serialized intermediate result, and stores the intermediate result in memory device(s) 512. The example first Edge node (e.g., Edge appliance 502) sends the intermediate result and associated identifiers to a second Edge node to execute the second portion. At the example second Edge node, example model execution circuitry 532 deserializer the intermediate result, calls the neural network model 700 from a data store 514 based on the associated identifier, and inputs the deserialized intermediate result into the CONV4 layer. With the example input to the second portion, the second Edge node can output a final result and send that data back to the first Edge node and/or the original device (e.g., IoT device, client compute node, etc.).

Figure 8:
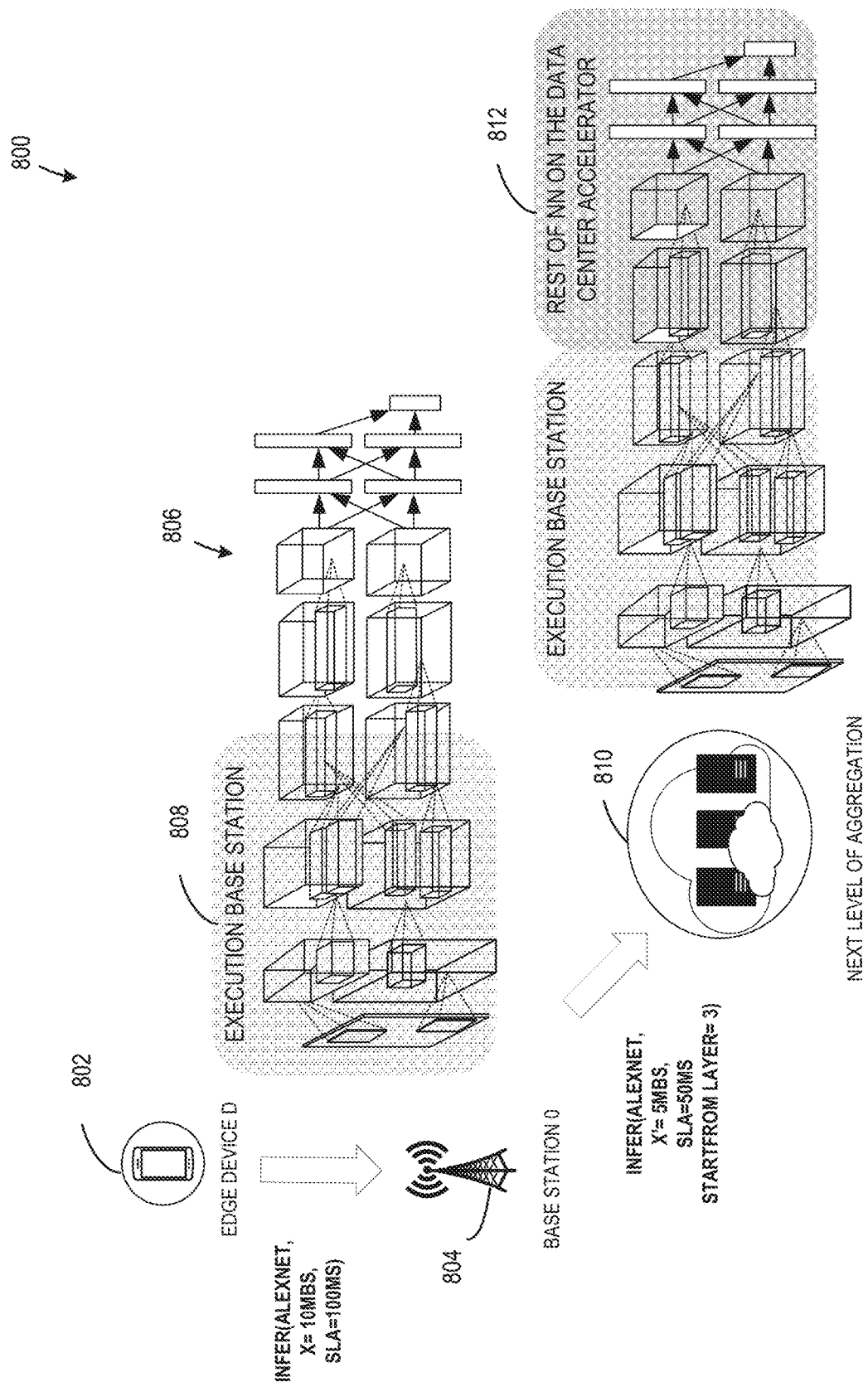
FIG. 8 is an illustration of the example neural network model of FIG. 7 separated by the example neural network partitioning system of FIG. 5 into a first portion executed on a first Edge node and a second portion executed on a second Edge node.

FIG. 8 is an illustration showing an example implementation of the neural network partitioning system at the first Edge node to divide (e.g., partition) a neural network for execution at the first Edge node and the second Edge node. In some examples, the Edge device 802 sends a request to an Edge base station 804 for processing input data (e.g., image data from a camera on the Edge device 802). In some instances, the Edge base station 804 is the Edge appliance 502 of FIG. 5 and/or has similar hardware architecture as the described Edge appliance 502. The example Edge base station 804 calls a neural network model 806 from storage that is designated for computing a result for the given input data. In some examples, the neural network model 806 is the neural network model(s) 536 illustrated in FIG. 5 and/or the neural network model 700 illustrated in FIG. 7.

The example Edge base station 804 of FIG. 8 partitions the model 806 into a first portion 808 based on variable inputs discussed above (e.g., computation energy consumption, transmission energy consumption, transmission time, etc.). The example Edge base station 804 executes the first portion 808 to generate an intermediate result. The Edge base station 804 sends the intermediate result with example identifier(s) to a next level of aggregation 810. The example identifier(s) indicate the neural network model that the next level of aggregation 810 executes. The example identifier(s) also indicate the layer of the neural network model that the next level of aggregation 810 executes first. In some examples, the next level of aggregation 810 corresponds to the Edge appliance 502 of FIG. 5. At the next level of aggregation 810 (e.g., Edge base station, Edge aggregation node, etc.), the model execution circuitry 532 inputs the deserialized intermediate result into the identified layer of the model 806 (e.g., second portion 812 input layer) and executes the second portion 812. Once the rest of the neural network model 806 is executed, the computed result is returned back to the Edge base station 804 and/or the Edge device 802.

In some examples, the apparatus includes means for sending and receiving data to and from devices on an Edge cloud network. For example, the means for sending and receiving may be implemented by the communication interface circuitry 520. In some examples, the communication interface circuitry 520 may be instantiated by processor circuitry such as the example processor circuitry 1212 of FIG. 12. For instance, the communication interface circuitry 520 may be instantiated by the example general purpose processor circuitry 1300 of FIG. 13 executing machine executable instructions such as that implemented by at least blocks 1002, 1020, and 1024 of FIG. 10. In some examples, the communication interface circuitry 520 may be instantiated by hardware logic circuitry, which may be implemented by an ASIC or the FPGA circuitry 1400 of FIG. 14 structured to perform operations corresponding to the machine readable instructions. Additionally or alternatively, the communication interface circuitry 520 may be instantiated by any other combination of hardware, software, and/or firmware. For example, the communication interface circuitry 520 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for monitoring network telemetry data indicating the network bandwidth available between a first Edge node and a second Edge node and/or a third Edge node. For example, the means for monitoring network telemetry data may be implemented by network telemetry monitoring circuitry 522. In some examples, the network telemetry monitoring circuitry 522 may be instantiated by processor circuitry such as the example processor circuitry 1212 of FIG. 12. For instance, the network telemetry monitoring circuitry 522 may be instantiated by the example general purpose processor circuitry 1300 of FIG. 13 executing machine executable instructions such as that implemented by at least block 1008 of FIG. 10. In some examples, the network telemetry monitoring circuitry 522 may be instantiated by hardware logic circuitry, which may be implemented by an ASIC or the FPGA circuitry 1400 of FIG. 14 structured to perform operations corresponding to the machine readable instructions. Additionally or alternatively, the network telemetry monitoring circuitry 522 may be instantiated by any other combination of hardware, software, and/or firmware. For example, the network telemetry monitoring circuitry 522 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for monitoring and managing battery subsystem power on an Edge appliance. For example, the means for monitoring and managing battery subsystem power may be implemented by power management circuitry 524. In some examples, the power management circuitry 524 may be instantiated by processor circuitry such as the example processor circuitry 1212 of FIG. 12. For instance, the power management circuitry 524 may be instantiated by the example general purpose processor circuitry 1300 of FIG. 13 executing machine executable instructions such as that implemented by at least block 1006 of FIG. 10. In some examples, the power management circuitry 524 may be instantiated by hardware logic circuitry, which may be implemented by an ASIC or the FPGA circuitry 1400 of FIG. 14 structured to perform operations corresponding to the machine readable instructions. Additionally or alternatively, the power management circuitry 524 may be instantiated by any other combination of hardware, software, and/or firmware. For example, the power management circuitry 524 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for estimating the power that will be consumed to execute the different layers of a neural network model on the Edge appliance, estimating the power that will be consumed to transmit the first portion to the second Edge node and/or third Edge node, and/or calculating the total estimated power consumption to execute and transmit the first portion based on executing example artificial intelligence algorithm(s), executing instruction(s), and/or referring to lookup table(s). For example, the means for estimating may be implemented by power consumption estimation circuitry 526. In some examples, the power consumption estimation circuitry 526 may be instantiated by processor circuitry such as the example processor circuitry 1212 of FIG. 12. For instance, the power consumption estimation circuitry 526 may be instantiated by the example general purpose processor circuitry 1300 of FIG. 13 executing machine executable instructions such as that implemented by at least blocks 902 and 906 of FIG. 9, 1004 of FIG. 10, and 1104, 1112, and 1116 of FIG. 11. In some examples, the power consumption estimation circuitry 526 may be instantiated by hardware logic circuitry, which may be implemented by an ASIC or the FPGA circuitry 1400 of FIG. 14 structured to perform operations corresponding to the machine readable instructions. Additionally or alternatively, the power consumption estimation circuitry 526 may be instantiated by any other combination of hardware, software, and/or firmware. For example, the power consumption estimation circuitry 526 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining the network bandwidth to be used for transmitting intermediate result(s), final result(s), and/or associated identifier(s) and means for calculating transmission times for sending the intermediate result(s), final result(s), and/or associated identifier(s). For example, the means for determining may be implemented by network bandwidth determination circuitry 528. In some examples, the network bandwidth determination circuitry 528 may be instantiated by processor circuitry such as the example processor circuitry 1212 of FIG. 12. For instance, the network bandwidth determination circuitry 528 may be instantiated by the example general purpose processor circuitry 1300 of FIG. 13 executing machine executable instructions such as that implemented by at least blocks 904 of FIG. 9 and 1114 and 1118 of FIG. 11. In some examples, the network bandwidth determination circuitry 528 may be instantiated by hardware logic circuitry, which may be implemented by an ASIC or the FPGA circuitry 1400 of FIG. 14 structured to perform operations corresponding to the machine readable instructions. Additionally or alternatively, the network bandwidth determination circuitry 528 may be instantiated by any other combination of hardware, software, and/or firmware. For example, the network bandwidth determination circuitry 528 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for partitioning a neural network model into a first portion to be executed on a first Edge node and a second portion to be executed on a second Edge node or a third Edge node. For example, the means for partitioning may be implemented by neural network partitioning circuitry 530. In some examples, the neural network partitioning circuitry 530 may be instantiated by processor circuitry such as the example processor circuitry 1212 of FIG. 12. For instance, the neural network partitioning circuitry 530 may be instantiated by the example general purpose processor circuitry 1300 of FIG. 13 executing machine executable instructions such as that implemented by at least blocks 908 of FIG. 9, 1010, 1012, 1014, and 1018 of FIG. 10, and 1106, 1108, 1110, 1120, and 1122 of FIG. 11. In some examples, the neural network partitioning circuitry 530 may be instantiated by hardware logic circuitry, which may be implemented by an ASIC or the FPGA circuitry 1400 of FIG. 14 structured to perform operations corresponding to the machine readable instructions. Additionally or alternatively, the neural network partitioning circuitry 530 may be instantiated by any other combination of hardware, software, and/or firmware. For example, the neural network partitioning circuitry 530 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for executing a neural network model including a first portion and/or a second portion of the neural network model. For example, the means for executing may be implemented by model execution circuitry 532. In some examples, the model execution circuitry 532 may be instantiated by processor circuitry such as the example processor circuitry 1212 of FIG. 12. For instance, the model execution circuitry 532 may be instantiated by the example general purpose processor circuitry 1300 of FIG. 13 executing machine executable instructions such as that implemented by at least blocks 1016 and 1022 of FIG. 10. In some examples, the model execution circuitry 532 may be instantiated by hardware logic circuitry, which may be implemented by an ASIC or the FPGA circuitry 1400 of FIG. 14 structured to perform operations corresponding to the machine readable instructions. Additionally or alternatively, the model execution circuitry 532 may be instantiated by any other combination of hardware, software, and/or firmware. For example, the model execution circuitry 532 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 9:
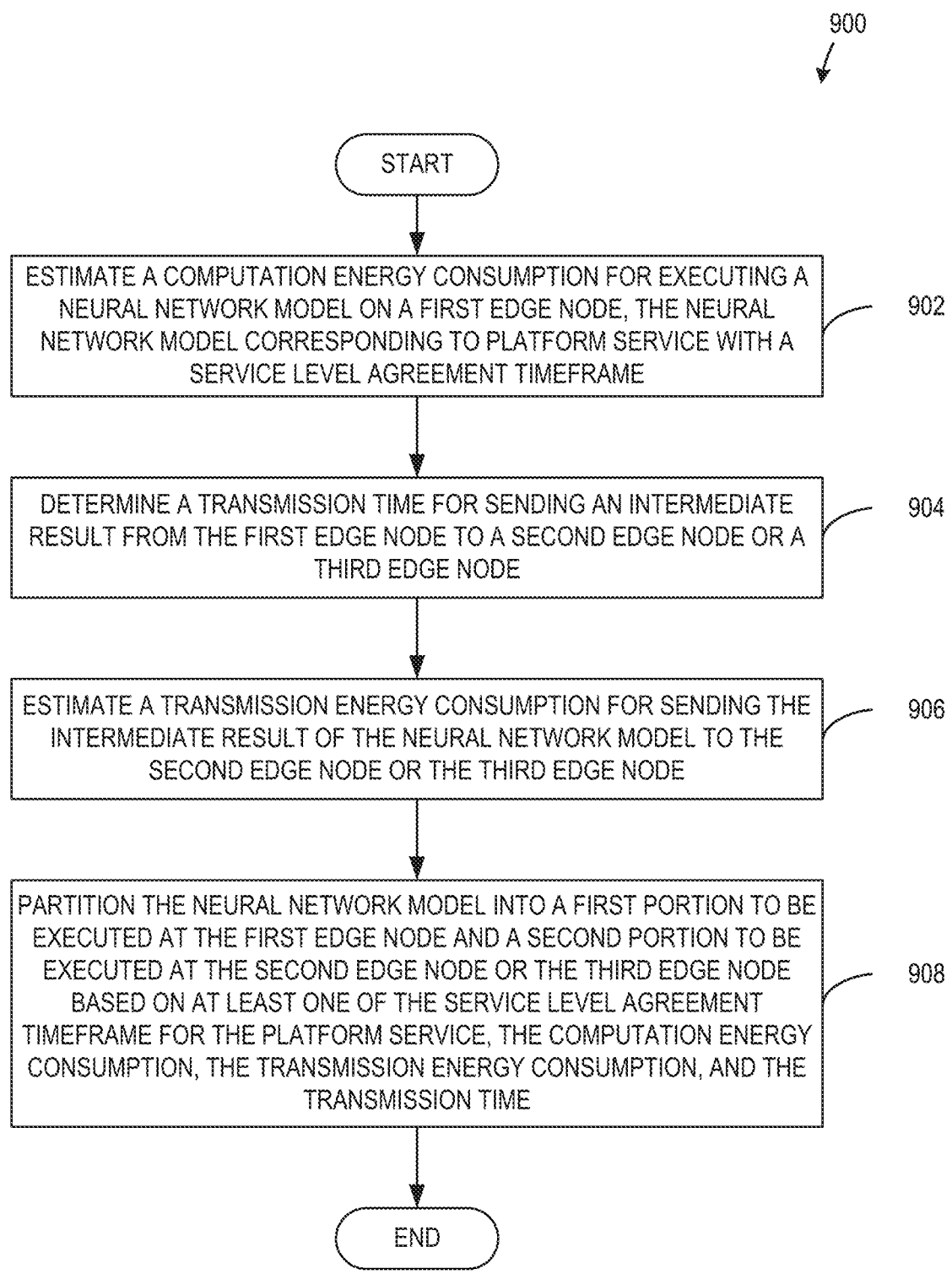
FIG. 9 is a flowchart representative of example machine readable instructions and/or example operations that may be executed and/or instantiated by example processor circuitry to implement the example neural network partitioning system of FIG. 5 to partition example neural network(s) into a first portion and a second portion based on a service level agreement timeframe, a computation energy consumption, a transmission energy consumption, and a transmission time.
Figure 10:
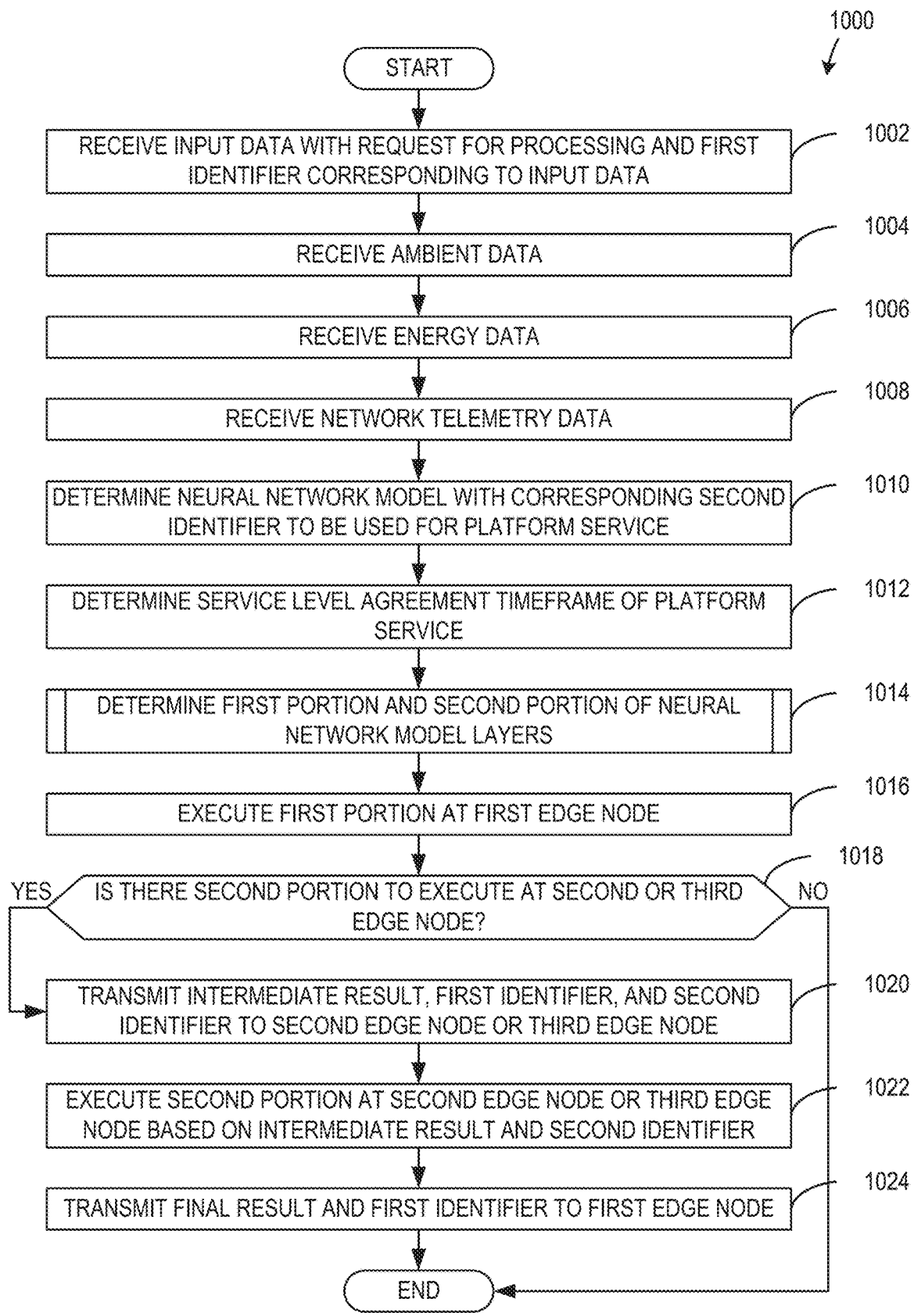
FIG. 10 is a flowchart representative of example machine readable instructions and/or example operations that may be executed and/or instantiated by example processor circuitry to implement the example neural network partitioning system of FIG. 5 to determine input variables to a neural network partitioning model and to execute the first portion at a first Edge node and a second portion at a second Edge node.
Figure 11:
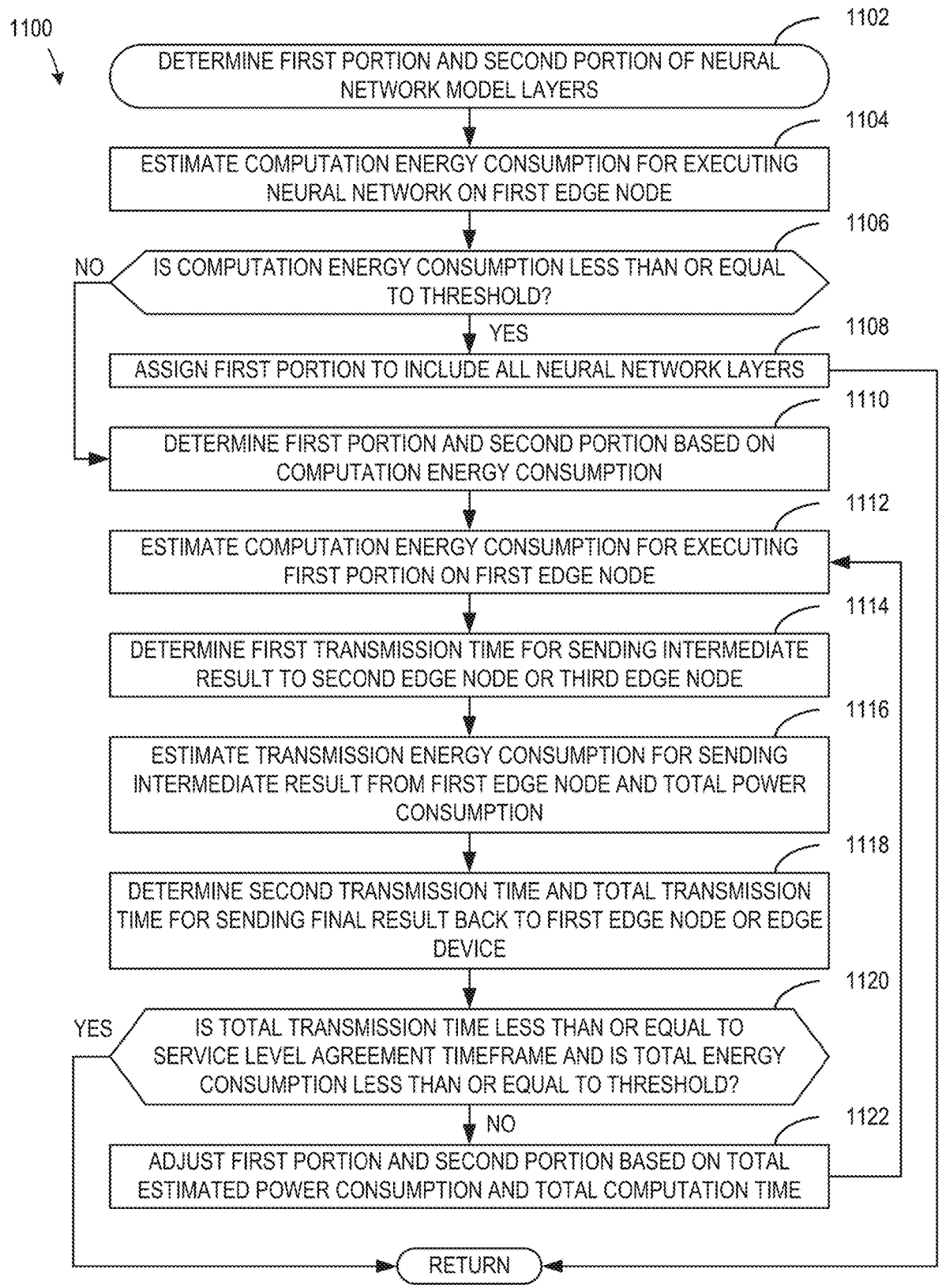
FIG. 11 is a flowchart representative of example machine readable instructions and/or example operations that may be executed and/or instantiated by example processor circuitry to implement the example neural network partitioning system of FIG. 5 to execute the neural network partitioning model to determine the first portion and the second portion of the example neural network(s).

Flowcharts representative of example hardware logic circuitry, machine readable instructions, hardware implemented state machines, and/or any combination thereof for implementing the Edge appliance 502 of FIG. 5, and/or, more generally, the neural network partitioning system 500 of FIG. 5, are shown in FIGS. 9, 10, and 11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 9, 10, and 11, many other methods of implementing the example Edge appliance 502, and/or, more generally, the neural network partitioning system 500, may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9, 10, and 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to partition a neural network model into a first portion to be executed on a first Edge node and a second portion to be executed on a second Edge node or a third Edge node. The machine readable instructions and/or the operations 900 of FIG. 9 begin at block 902, at which the Edge appliance 502 estimates a computation energy consumption for executing a neural network model for a platform service on a first edge node. For example, the power consumption circuitry 526 can estimate the amount(s) of power that the Edge appliance 502 would consume if the processor circuitry on the Edge appliance 502 were to execute one or more layers of an artificial neural network model 536 when performing a requested computation. The power consumption estimation circuitry 526 can execute an artificial intelligence algorithm (e.g., neural network model(s) 536), execute instructions on the Edge appliance 502, refer to look-up table(s) etc. to estimate (e.g., infer, determine, assess, compute, etc.) the amount of energy the Edge appliance 502 would consume to compute and/or transmit an intermediate result and/or a final result.

At block 904, the Edge appliance 502 determines a first transmission time for sending an intermediate result from the first Edge node to the second Edge node or the third Edge node. For example, the network bandwidth determination circuitry 528 can determine the first transmission time for sending the intermediate result, a first identifier, and/or a second identifier from the first Edge node to the second Edge node or the third Edge node.

At block 906, the Edge appliance 502 estimates a transmission energy consumption for sending the intermediate result of the neural network model 536 to the second Edge node or the third Edge node. For example, the power consumption estimation circuitry 526 can estimate a transmission energy consumption for sending the intermediate result, the first identifier, and/or the second identifier to the second Edge node or the third Edge node. The power consumption estimation circuitry 526 can execute an artificial intelligence algorithm (e.g., neural network model(s) 536), execute instructions on the Edge appliance 502, refer to look-up table(s) etc. to estimate (e.g., infer, determine, assess, compute, etc.) the amount of energy the Edge appliance 502 would consume to compute and/or to transmit the intermediate result and/or the final result.

At block 908, the Edge appliance 502 partitions the neural network model 536 into the first portion to be executed at the first Edge node and the second portion to be executed at the second Edge node or the third Edge node. For example, the neural network partitioning circuitry 530 can partition the neural network model 536 based on at least one of a service level agreement timeframe for the platform service, the computation energy consumption, the transmission energy consumption, and the transmission time. The first portion and/or second portion can include one layer of the neural network model 536 or multiple layers of the neural network model 536.

FIG. 10 is a flowchart representative of example machine readable instructions and/or example operations 1000 that may be executed and/or instantiated by processor circuitry to receive a computation request from an Edge device, partition the appropriate artificial neural network 536 for processing the computation request, and execute the first portion and/or second portion of the artificial neural network 536. The machine readable instructions and/or the operations 1000 of FIG. 10 begin at block 1002, at which the Edge appliance 502 receives input data and the computation request from the Edge device (e.g., Internet of Things (IoT) device, endpoint, Edge base station, client compute node, etc.). For example, the communication interface circuitry 520 can receive the input data and the computation request from the Edge device in communication with the first Edge node. The communication interface circuitry 520 can also assign a first identifier to the input data and/or the computation request such that the Edge device can associate the output result with the correct input data and/or computation request.

At block 1004, the Edge device 502 receives ambient data (e.g., external temperature, internal temperature, wind speed, humidity, etc.) from the ambient sensor(s) 510. For example, the power consumption estimation circuitry 526 can receive the ambient data and use the ambient data to estimate the computation energy consumption (e.g., the power used to execute the neural network model 536 layer(s)) and/or the transmission energy consumption (e.g., the power used to send the output(s)).

At block 1006, the Edge appliance 502 receives energy data (e.g., remaining power, energy generation rate, energy loss rate, etc.) from the battery subsystem 506. For example, the power management circuitry 524 can receive the energy data and send the energy data to the power consumption estimation circuitry 526. The power consumption estimation circuitry 526 uses the energy data to determine whether the power used to execute certain layers of the neural network model is below a predefined power consumption threshold. In some examples, the power consumption estimation circuitry 526 passes the energy data to neural network partitioning circuitry 530 to make the determination. Additionally or alternatively, the power consumption estimation circuitry 526 and/or the neural network partitioning circuitry 530 receive the energy data directly from the battery subsystem 506.

At block 1008, the Edge appliance 502 receives network telemetry data indicating the amount of network bandwidth available for sending data across the Edge cloud 504. For example, the network telemetry monitoring circuitry 522 can receive the network telemetry data and pass the network telemetry data to network bandwidth determination circuitry 528 for further processing. The network bandwidth determination circuitry 528 uses the network telemetry data to determine the time to transmit given data based on available network bandwidth and size of the data.

At block 1010, the Edge appliance 502 determines the neural network model 536 used to compute and/or operate the Edge device request. For example, the neural network partitioning circuitry 530 can determine the neural network model 536 and a second identifier used to indicate the neural network model 536. The neural network partitioning circuitry 530 can determine the neural network model 536 based on the type of data processing the Edge device requested and/or a platform service corresponding to the request.

At block 1012, the Edge appliance 502 identifies a service level agreement timeframe of the platform service corresponding to the request and/or the input data. For example, the neural network partitioning circuitry 530 can identify the service level agreement timeframe that indicates a time limit for which a data output response is expected from the Edge appliance 502.

At block 1014, the Edge appliance 502 determines a first portion and a second portion of the neural network model 536 layers. For example, the neural network partitioning circuitry 530 determines the first portion to execute at the first Edge node and the second portion to execute at the second Edge node and/or the third Edge node. An example process that may be executed and/or instantiated by processor circuitry to implement block 1014 is described below in connection with FIG. 11.

At block 1016, the Edge appliance 502 executes the first portion of the neural network model 536. For example, the model execution circuitry 532 can execute the neural network model 536 and implement logic and/or instructions to stop the neural network model 536 execution the moment the model execution circuitry 532 executes the final layer of the first portion. The model execution circuitry 532 merges the results of the neurons included in the final layer of the first portion into the intermediate result. The model execution circuitry 532 stores the intermediate result and the second identifier in memory device(s) 512 for transmission. Additionally or alternatively, the model execution circuitry 532 includes the starting layer of the second portion in the second identifier and/or in a different identifier, variable, output, etc.

At block 1018, the Edge appliance 502 determines if there is a second portion to execute at the second Edge node or third Edge node. For examples, the neural network partitioning circuitry 530 can determine if the first portion includes the full neural network model 536. If the neural network partitioning circuitry 530 determines that there is no second portion to execute, then the process and/or operation 900 ends.

At block 1020, if the neural network partitioning circuitry 530 verifies that the second portion was determined, then the Edge appliance 502 transmits the intermediate result, the first identifier, and/or the second identifier to the second Edge node or third Edge node. For example, the communication interface circuitry 520 can transmit (e.g., send) the intermediate result, the first identifier, and/or the second identifier to the second Edge node or third Edge node as inputs to the second portion.

At block 1022, the Edge appliance 502 executes the second portion at the second Edge node or third Edge node. For example, the model execution circuitry 532 can execute the second portion at the second Edge node or third Edge node. The second Edge node and the third Edge node are structured with the same hardware circuitry and data stores (e.g., data store 514, neural network model(s) 536, etc.) as the first Edge node (e.g., the Edge appliance 502). The model execution circuitry 532 can ungroup the intermediate result and input the individual results to the respective neurons included in the initial layer of the second portion. The model execution circuity 532 can execute the second portion and output a final result of the neural network model 536.

At block 1024, the Edge appliance 502 sends the final result back to the first Edge node and/or the Edge device that originally made the request. For example, the communication interface circuitry 520 of the second Edge node or the third Edge node can transmit the final result. The communication interface circuitry 520 can send the first identifier with the final result to the first Edge node and/or the Edge device. The first Edge node and/or the Edge device use the first identifier to associate the final result with the input data and the computation request FIG. 11 is a flowchart representative of example machine readable instructions and/or example operations 1100 that may be executed and/or instantiated by processor circuitry to determine the first portion and the second portion of the artificial neural network model to be executed on the first Edge node and the second Edge node (or third Edge node), respectively. The machine readable instructions and/or the operations 1100 of FIG. 11 can be executed and/or instantiated by processor circuitry to implement block 1014 of FIG. 10. The machine readable instructions and/or the operations 1100 of FIG. 11 begin at block 1102, at which the Edge appliance 502 signals to the power consumption estimation circuitry 526 that the subprocess, operation, and/or function for determining the first portion and the second portion has begun. For example, the neural network partitioning circuitry 530 can send a request to the power consumption estimation circuitry to send the estimated computation energy consumption and/or the energy data and/or the ambient data.

At block 1104, the Edge appliance 502 estimates the computation energy consumption for executing each layer of the neural network model 536 for the given request and platform service. For example, the power consumption estimation circuitry 526 can execute an artificial intelligence algorithm (e.g., neural network model(s) 536), execute instructions stored on the Edge appliance 502, and/or read from lookup table(s) to estimate (e.g., determine, assess, compute, etc.) the computation energy consumption given ambient data, energy data, the neural network model(s) 536 to be partitioned and executed, etc. The power consumption estimation circuitry 526 can assess the ambient data (e.g., temperature, humidity, wind speed, etc.) received from the ambient sensor(s) 510 to infer how quickly the battery subsystem 506 will drain power during the execution of the full neural network model 536. The ambient data is also factored into a dynamic and/or static power consumption threshold determination for the given neural network model 536. For example, if it is sunny outside with the ambient sensor(s) measuring an above average irradiance level, then the power consumption estimation circuitry 526 may determine that the power threshold is higher than usual since the renewable energy infrastructure 508 can replenish energy in a higher-than-average timeframe considering the above average irradiance level.

At block 1106, the Edge appliance 502 receives the computation energy consumption estimation for executing the full neural network model 536 given the ambient conditions and the power consumption threshold that the power consumption estimation circuitry 526 has determined. For example, the neural network partitioning circuitry 530 can determine if the estimated computation energy consumption satisfies the power consumption threshold. If the estimated computation energy consumption satisfies the power consumption threshold, then the subprocess proceeds to block 1108, at which point the Edge appliance 502 categorizes the full neural network model 536 as the first portion. For example, the neural network partitioning circuitry 530 can indicate that execution of the neural network model 536 on the first Edge node ends at the final layer of the neural network model 536. The example instructions and/or operations 1100 then return to block 1016, at which the model execution circuitry 532 executes the first portion of the neural network model 536.

At block 1110, if the neural network partitioning circuitry 530 determines that the estimated computation energy consumption is greater than or equal to the power consumption threshold, then the example instructions and/or operations 1100 proceeds to block 1110, at which the Edge appliance 502 determines the first portion and the second portion of the neural network model based on the estimated computation energy consumption. For example, the neural network partitioning circuitry 530 can execute neural network partitioning model(s) 534 to infer how many layers (e.g., one layer and/or multiple layers) can be allocated to the first portion such that execution of the first portion on the first Edge node does not exceed the power threshold. The neural network partitioning model(s) 534 are trained via machine learning techniques and does not undergo further feedback training during operation.

At block 1112, the Edge appliance 502 estimates the computation energy consumption for executing the first portion on the first Edge node. For example, the power consumption estimation circuitry 526 can execute an artificial intelligence algorithm (e.g., neural network model(s) 536), execute instructions stored on the Edge appliance 502, and/or read from lookup table(s) to estimate (e.g., determine, assess, compute, etc.) the computation energy consumption given ambient data, energy data, the determined first portion of the neural network model(s) 536 to be executed, etc. The power consumption estimation circuitry 526 can estimate the computation energy consumption of the first portion rather than each layer of the neural network model 536 and/or the full neural network model 536.

At block 1114, the Edge appliance 502 determines a first transmission time for sending the intermediate result of the first portion to the second Edge node or the third Edge node. For example, the network bandwidth determination circuitry 528 can determine the time taken to transmit (e.g., send) the intermediate result, the first identifier, and/or the second identifier from the first Edge node to the second Edge node and/or third Edge node. The network bandwidth determination circuitry 528 can determine and/or predict the amount of data included in the intermediate result either before or after the model execution circuitry 532 executes the first portion. The network bandwidth determination circuitry 528 can also receive network bandwidth telemetry data from the network telemetry monitoring circuitry 522 indicating the network bandwidth available between the first Edge node and the second Edge node and/or between the first Edge node and the third Edge node. Based on the size of the intermediate result, the first identifier, and/or the second identifier as well as the available network bandwidth, the network bandwidth determination circuitry 528 can calculate the first transmission time.

At block 1116, the Edge appliance 502 estimates the transmission energy consumption for sending the intermediate result, the first identifier, and/or the second identifier from the first Edge node to the second Edge node or the third Edge node. For example, the power consumption estimation circuitry 526 can execute an artificial intelligence algorithm (e.g., neural network model(s) 536), execute instructions stored on the Edge appliance 502, and/or read from lookup table(s) to estimate (e.g., determine, assess, compute, etc.) the transmission energy consumption given ambient data, energy data, the neural network model(s) 536 to be partitioned and executed, the determined first portion of the neural network model(s) 536, etc. The power consumption estimation circuitry 526 can use ambient data and available power data to estimate the transmission energy consumption. The power consumption estimation circuitry 526 can also sum the computation energy consumption and the transmission energy consumption to calculate a total energy consumption.

At block 1118, the Edge appliance 502 determines a second transmission time for sending a final result back to the first Edge node or the Edge device. For example, the network bandwidth determination circuitry 528 can receive data indicating a size of the final result from the model execution circuitry 532 to determine the second transmission time. Additionally and/or alternatively, the network bandwidth determination circuitry 528 can execute logic, instructions, and/or neural network model(s) (e.g., neural network partitioning model(s) 534, neural network model(s) 536, etc.) to determine and/or predict the size of the final result, and thus, the second transmission time. The network bandwidth determination circuitry 528 can also sum the first transmission time and the second transmission time to calculate a total transmission time.

At block 1120, the Edge appliance 502 determines if the total transmission time satisfies (e.g., is less than or equal to) the service level agreement timeframe and if the total energy consumption satisfies the power consumption threshold. For example, the neural network partitioning circuitry 530 can verify that the determined size of the first portion satisfies the necessary conditions (e.g., the total transmission time and the total energy consumption). If both conditions are satisfied, then the example instructions and/or operations 1100 conclude. For example, the machine readable instructions and/or the operations 1100 can return to block 1016 of the machine readable instructions and/or the operations 1000 of FIG. 10, at which the first portion is executed on the first Edge node.

At block 1122, if the Edge appliance 502 determines that the total transmission time is greater than the service level agreement timeframe or that the total energy consumption is greater than the power consumption threshold, then the Edge appliance 502 adjusts the number of layers in the first portion and the second portion. For example, if the total transmission time is above the service level agreement timeframe, then the neural network partitioning circuitry 530 can decrease the number of layers in the first portion. After block 1122 is executed, the example instructions and/or operations 1100 proceeds to block 1112 where the power consumption estimation circuitry 526 estimates the computation energy consumption for executing the first portion.

Figure 12:
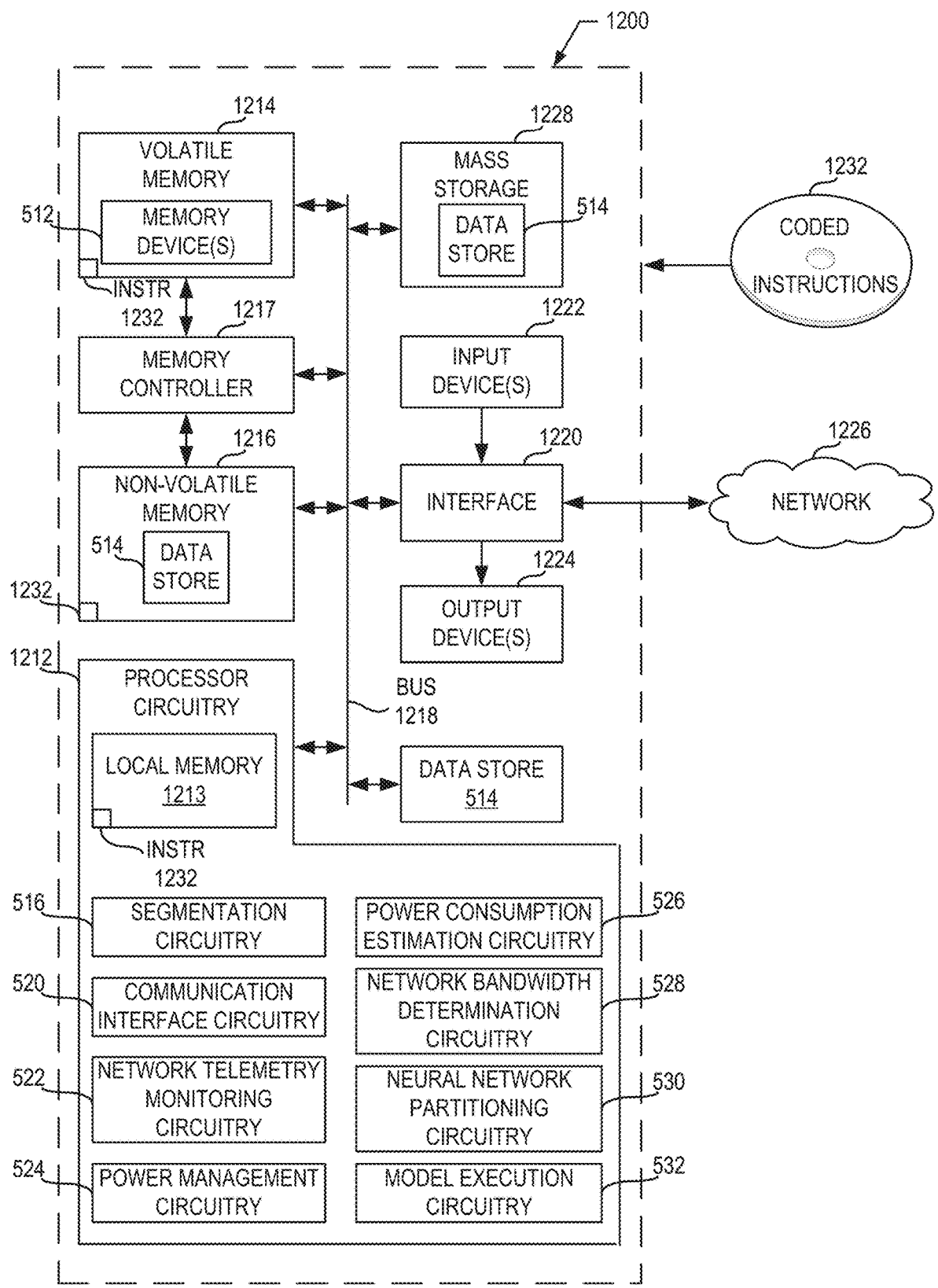
FIG. 12 is a block diagram of an example processing platform including processor circuitry structured to execute the example machine readable instructions and/or the example operations of FIGS. 9, 10, and 11 to implement the example neural network partitioning system of FIG. 5.

FIG. 12 is a block diagram of an example processor platform 1200 structured to execute and/or instantiate the machine readable instructions and/or the operations of FIGS. 9, 10, and 11 to implement the neural network partitioning system 500 of FIG. 5. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example segmentation circuitry 516, the example communication interface circuitry 520, the example network telemetry monitoring circuitry 522, the example power management circuitry 524, the example power consumption estimation circuitry 526, the example network bandwidth determination circuitry 528, the example neural network partitioning circuitry 530, and the example model execution circuitry 532 of FIG. 5

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory)(RDRAM®, and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 1228 implement the data store 514 of FIG. 5.

The machine executable instructions 1232, which may be implemented by the machine readable instructions of FIGS. 9, 10, and 11, may be stored in the mass storage device 1228, in the volatile memory 1214, in the non-volatile memory 1216, and/or on a removable non-transitory computer readable storage medium such as a CD or DVD.

Figure 13:
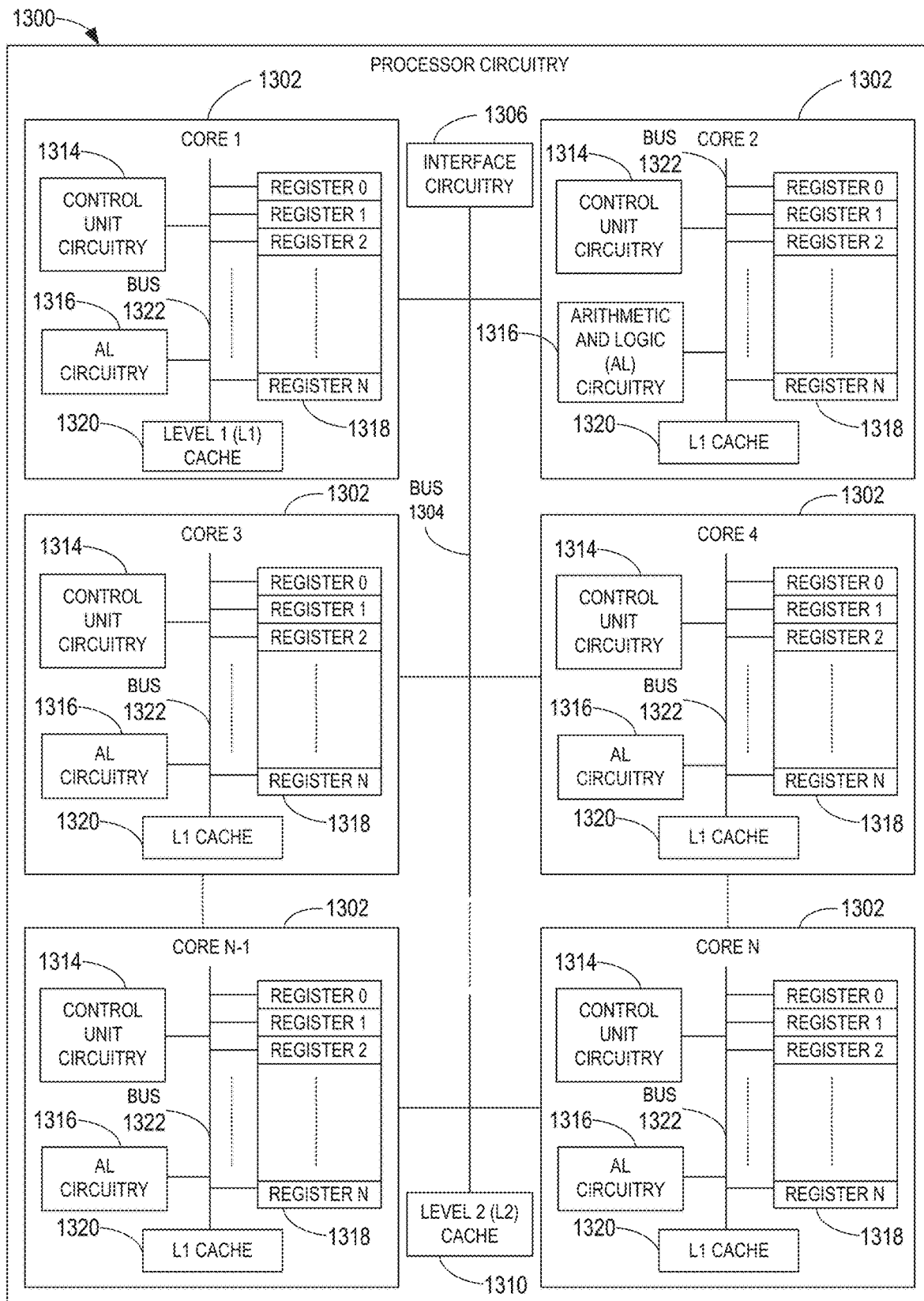
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a general purpose microprocessor 1300. The general purpose microprocessor circuitry 1300 executes some or all of the machine readable instructions of the flowcharts of FIGS. 9, 10, and 11 to effectively instantiate the circuitry of FIG. 5 as logic circuits to perform the operations corresponding to those machine readable instructions. In some such examples, the circuitry of FIG. 5 is instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 9, 10, and 11.

The cores 1302 may communicate by a first example bus 1304. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAS), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
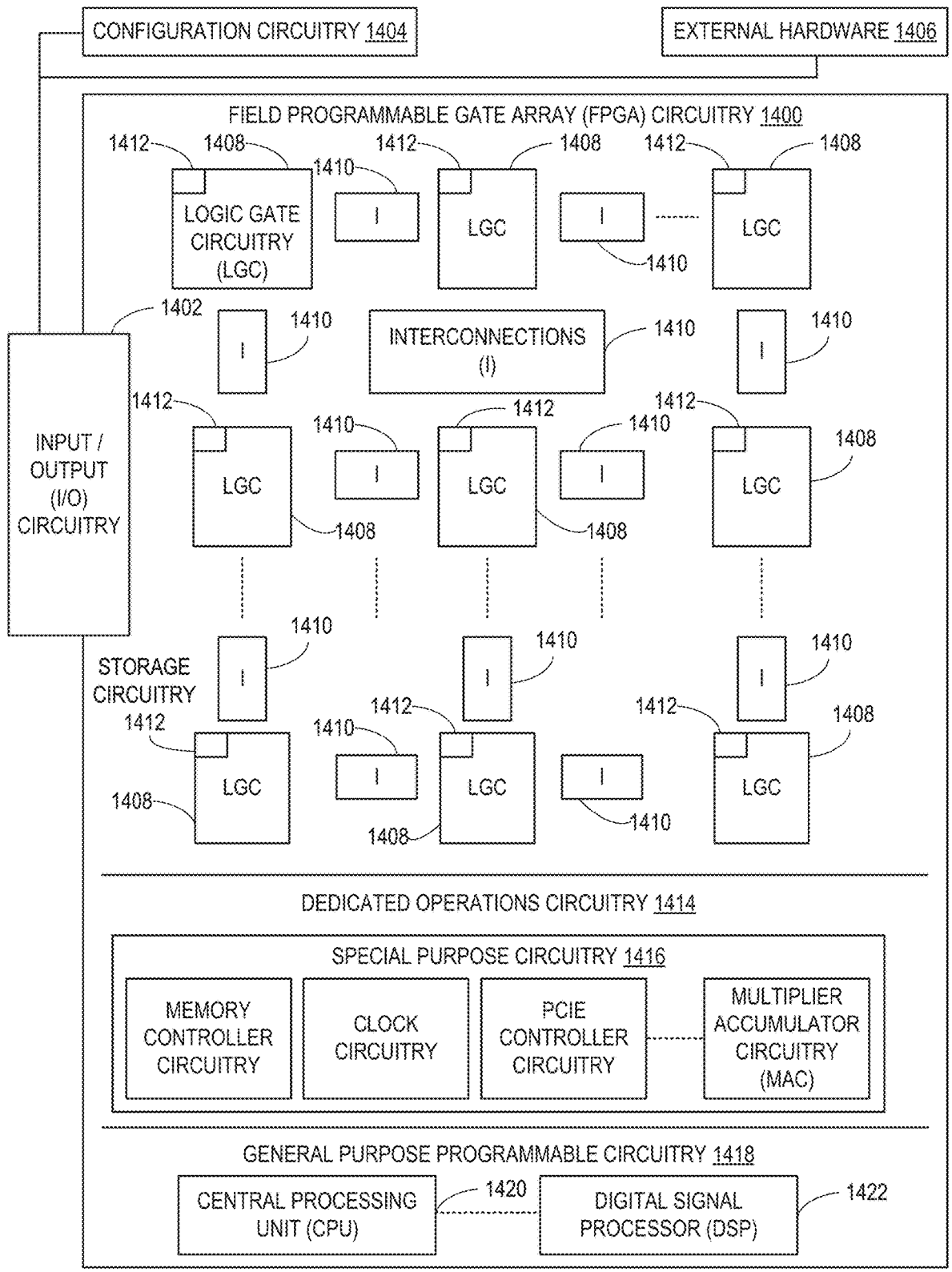
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 9, 10, and 11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 9, 10, and 11. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 9, 10, and 11. As such, the FPGA circuitry 1400 may be structured to effectively instantiate some or all of the machine readable instructions of the flowcharts of FIGS. 9, 10, and 11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 9, 10, and 11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIGS. 9, 10, and 11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Figure 15:
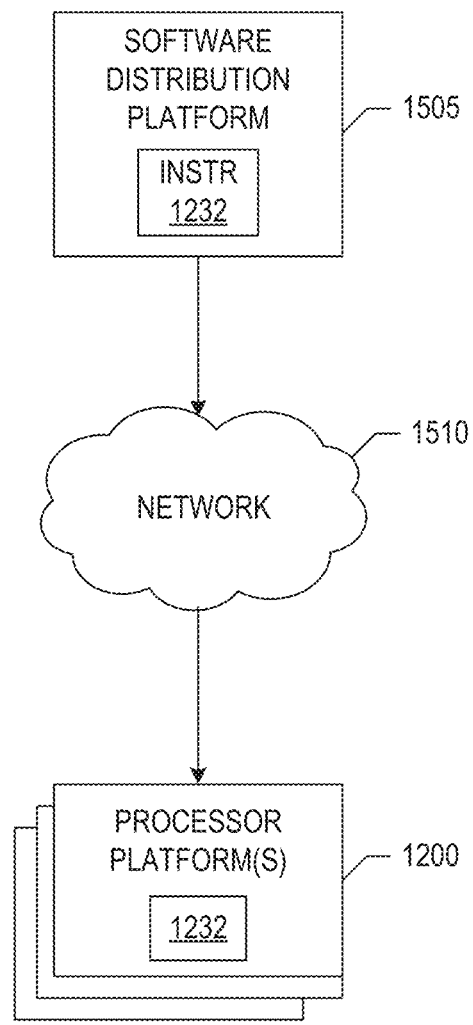
FIG. 15 is a block diagram of an example software distribution platform (e.g., one or more servers) to distribute software (e.g., software corresponding to the example machine readable instructions of FIGS. 9, 11, and 12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

Although FIGS. 14 and 15 illustrate two example implementations of the processor circuitry 1212 of FIG. 12, many other approaches are contemplated. For example, as mentioned above, modern FPGA circuitry may include an onboard CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 9, 10, and 11 may be executed by one or more of the cores 1302 of FIG. 13, a second portion of the machine readable instructions represented by the flowcharts of FIGS. 9, 10, and 11 may be executed by the FPGA circuitry 1400 of FIG. 14, and/or a third portion of the machine readable instructions represented by the flowcharts of FIGS. 9, 10, and 11 may be executed by an ASIC. It should be understood that some or all of the circuitry of FIG. 5 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions 900, 1000, 1100 of FIGS. 9, 10, and 11, as described above. The one or more servers of the example software distribution platform 1505 are in communication with a network 1510, which may correspond to any one or more of the Internet and/or any of the example networks (e.g., the edge cloud 504, the network 1226, etc.) described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 1232 of FIG. 12, may be downloaded to the example processor platform 1200, which is to execute the machine readable instructions 1232 to implement the neural network partitioning system 500. In some examples, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that partition, segment, and/or otherwise divide a neural network model, that an Edge device requests, into a first portion and a second portion. A first Edge node executes the first portion and transmits the second portion to a second Edge node or a third Edge for execution. Thereby, the first Edge node consumes less power than an Edge node that executes the full neural network, while returning a result back to the Edge device within a service level agreement timeframe that the request necessitates. Disclosed systems, methods, apparatus, and articles of manufacture improve the efficiency of using a computing device by partitioning a neural network model on a first Edge node into a first portion to be executed on a first Edge node and a second portion to be executed on a second node at a higher level of aggregation than the first Edge node, thereby increasing power savings of the first Edge node. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to partition, segment, and/or otherwise divide a neural network model, that is to be executed on a first Edge node, into a first portion and a second portion are disclosed herein. Further examples and combinations thereof include the following:

Example 1 includes an apparatus to partition a neural network model comprising interface circuitry to communicate with an edge device, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate power consumption estimation circuitry to estimate a computation energy consumption for executing the neural network model on a first edge node, the neural network model corresponding to a platform service with a service level agreement timeframe, network bandwidth determination circuitry to determine a transmission time for sending an intermediate result from the first edge node to a second edge node or a third edge node, power consumption estimation circuitry to estimate a transmission energy consumption for sending the intermediate result of the neural network model to the second edge node or the third edge node, and neural network partitioning circuitry to partition the neural network model into a first portion to be executed at the first edge node and a second portion to be executed at the second edge node or the third edge node based on at least one of the service level agreement timeframe for the platform service, the computation energy consumption, the transmission energy consumption, or the transmission time.

In Example 2, the subject matter of Example 1 can optionally include that, wherein the processor circuitry is to perform at least one of the first operations, the second operations, or the third operations to instantiate the network bandwidth determination circuitry to determine the transmission time based on available network bandwidth and a payload size, the payload size including the intermediate result.

In Example 3, the subject matter of Examples 1-2 can optionally include that, wherein the transmission time is a first transmission time, and the processor circuitry is to perform at least one of the first operations, the second operations, or the third operations to instantiate the network bandwidth determination circuitry to determine a second transmission time for sending a final result from the second edge node or the third edge node to the first edge node, calculate a total transmission time based on a sum of the first transmission time and the second transmission time, the partitioning of the neural network model into the first portion and the second portion based on the total transmission time satisfying the service level agreement timeframe.

In Example 4, the subject matter of Examples 1-3 can optionally include that, wherein the processor circuitry is to perform at least one of the first operations, the second operations, or the third operations to instantiate the network bandwidth determination circuitry to receive temperature data from a temperature sensor, receive wind data from a wind sensor, and receive humidity data from a humidity sensor, the estimation of at least one of the computation energy consumption or the transmission energy consumption based on at least one of the temperature data, the wind data, or the humidity data.

In Example 5, the subject matter of Examples 1-4 can optionally include that, wherein the processor circuitry is to perform at least one of the first operations, the second operations, or the third operations to instantiate the network bandwidth determination circuitry to estimate at least the computation energy consumption or the transmission energy consumption based on at least one of an artificial intelligence algorithm, a set of instructions, or a lookup table, and calculate a total power consumption based on a sum of the computation energy consumption and the transmission energy consumption, the partitioning of the neural network model into the first portion and the second portion based on the total power consumption satisfying a power consumption threshold.

In Example 6, the subject matter of Examples 1-5 can optionally include that, wherein the processor circuitry is to assign a first identifier to input data that the neural network model is to process, assign a second identifier to the intermediate result, the second identifier to identify (i) the neural network model that is to be executed at the second edge node or the third edge node (ii) an initial layer of the second portion that the second edge node or the third edge node is to execute, send the intermediate result to the second edge node or the third edge node with the second identifier, and determine a final result based on the intermediate result and the second identifier, the second identifier to identify the second portion of the neural network model that the second edge node or the third edge node is to execute.

Example 7 includes at least one non-transitory computer readable medium comprising instructions that, when executed, cause processor circuitry to at least infer a computation energy consumption for executing a neural network model on a first edge node, the neural network model corresponding to a platform service with a service level agreement timeframe, compute a transmission time for transmitting an intermediate output from the first edge node to a second edge node or a third edge node, infer a transmission energy consumption for transmitting the intermediate output of the neural network model to the second edge node or the third edge node, and segment the neural network model into a first portion to be executed at the first edge node and a second portion to be executed at the second edge node or the third edge node based on at least one of the service level agreement timeframe for the platform service, the computation energy consumption, the transmission energy consumption, or the transmission time.

In Example 8, the subject matter of Example 7 can optionally include that, wherein the instructions, when executed, cause the processor circuitry to compute the transmission time based on available network bandwidth and a payload size, the payload size including the intermediate output.

In Example 9, the subject matter of Examples 7-8 can optionally include that, wherein the transmission time is a first transmission time, and the instructions, when executed, cause the processor circuitry to compute a second transmission time for sending a final result from the second edge node or the third edge node to the first edge node, determine a total transmission time based on a sum of the first transmission time and the second transmission time, the segmenting of the neural network model into the first portion and the second portion based on the total transmission time satisfying the service level agreement timeframe.

In Example 10, the subject matter of Examples 7-9 can optionally include that, wherein the instructions, when executed, cause the processor circuitry to receive temperature data from a temperature sensor, receive wind data from a wind sensor, and receive humidity data from a humidity sensor, the inference of at least one of the computation energy consumption or the transmission energy consumption based on at least one of the temperature data, the wind data, or the humidity data.

In Example 11, the subject matter of Examples 7-10 can optionally include that, wherein the instructions, when executed, cause the processor circuitry to infer at least the computation energy consumption or the transmission energy consumption based on at least one of an artificial intelligence algorithm, a set of instructions, or a lookup table, and compute a total power consumption based on a sum of the computation energy consumption and the transmission energy consumption, the segmentation of the neural network model into the first portion and the second portion based on the total power consumption satisfying a power consumption threshold.

In Example 12, the subject matter of Examples 7-11 can optionally include that, wherein the instructions, when executed, cause the processor circuitry to assign a first identifier to input data that the neural network model is to process, assign a second identifier to the intermediate output, the second identifier to identify (i) the neural network model that is to be executed at the second edge node or the third edge node (ii) an initial layer of the second portion that the second edge node or the third edge node is to execute, send the intermediate output to the second edge node or the third edge node with the second identifier, and determine a final result based on the intermediate output and the second identifier, the second identifier to identify the second portion of the neural network model that the second edge node or the third edge node is to execute.

Example 13 includes an apparatus to partition a neural network model, the apparatus comprising means for determining a computation energy consumption for executing a neural network model on a first edge node, the neural network model corresponding to a platform service with a service level agreement timeframe, including means for determining a transmission energy consumption for sending an intermediate computation of the neural network model to a second edge node or a third edge node, means for calculating a transmission time for sending the intermediate computation from the first edge node to the second edge node or the third edge node, and means for dividing the neural network model into a first portion to be executed at the first edge node and a second portion to be executed at the second edge node or the third edge node based on at least one of the service level agreement timeframe for the platform service, the computation energy consumption, the transmission energy consumption, and the transmission time.

In Example 14, the subject matter of Example 13 can optionally include that, wherein the means for calculating is to calculate the transmission time based on available network bandwidth and a payload size, the payload size including the intermediate computation.

In Example 15, the subject matter of Examples 13-14 can optionally include that, wherein the transmission time is a first transmission time, and the means for calculating is to calculate a second transmission time for sending a final result from the second edge node or the third edge node to the first edge node, compute a total transmission time based on a sum of the first transmission time and the second transmission time the dividing of the neural network model into the first portion and the second portion based on the total transmission time satisfying the service level agreement timeframe.

In Example 16, the subject matter of Examples 13-15 can optionally include that, wherein the means for determining is to determine at least one of the computation energy consumption or the transmission energy consumption based on received ambient data including at least one of temperature data, wind data, or humidity data.

In Example 17, the subject matter of Examples 13-16 can optionally include that, wherein the means for determining is to determine at least the computation energy consumption or the transmission energy consumption based on at least one of an artificial intelligence algorithm, a set of instructions, or a lookup table, and determine a total power consumption based on a sum of the computation energy consumption and the transmission energy consumption, the dividing of the neural network model into the first portion and the second portion based on the total power consumption satisfying a power consumption threshold.

In Example 18, the subject matter of Examples 13-17 can optionally include that, further including means for assigning a first identifier to input data that the neural network model is to process, wherein the means for assigning is to assign a second identifier to the intermediate computation, the second identifier to identify (i) the neural network model that is to be executed at the second edge node or the third edge node (ii) an initial layer of the second portion that the second edge node or the third edge node is to execute, means for sending the intermediate computation to the second edge node or the third edge node with the second identifier, and means for determining a final computation based on the intermediate computation and the second identifier, the second identifier to identify the second portion of the neural network model that the second edge node or the third edge node is to execute.

Example 19 includes a method comprising estimating, by executing an instruction with processor circuitry, a computation energy consumption for executing a neural network model on a first edge node, the neural network model corresponding to a platform service with a service level agreement timeframe, determining, by executing an instruction with the processor circuitry, a transmission time for sending an intermediate result from the first edge node to a second edge node or a third edge node, estimating by executing an instruction with the processor circuitry, a transmission energy consumption for sending the intermediate result of the neural network model to the second edge node or the third edge node, and partitioning, by executing an instruction with the processor circuitry, the neural network model into a first portion to be executed at the first edge node and a second portion to be executed at the second edge node or the third edge node based on at least one of the service level agreement timeframe for the platform service, the computation energy consumption, the transmission energy consumption, or the transmission time.

In Example 20, the subject matter of Example 19 can optionally include that, wherein determining the transmission time is based on available network bandwidth and a payload size, the payload size including the intermediate result.

In Example 21, the subject matter of Examples 19-20 can optionally include that, wherein the transmission time is a first transmission time, and further including determining a second transmission time for sending a final result from the second edge node or the third edge node to the first edge node, calculating a total transmission time based on a sum of the first transmission time and the second transmission time, the partitioning of the neural network model into the first portion and the second portion based on the total transmission time satisfying the service level agreement timeframe.

In Example 22, the subject matter of Examples 19-21 can optionally include that, wherein estimating the computation energy consumption includes receiving temperature data from a temperature sensor, receiving wind data from a wind sensor, and receiving humidity data from a humidity sensor, the estimation of at least one of the computation energy consumption or the transmission energy consumption based on at least one of the temperature data, the wind data, or the humidity data.

In Example 23, the subject matter of Examples 19-22 can optionally include that, further including estimating at least the computation energy consumption or the transmission energy consumption based on at least one of an artificial intelligence algorithm, a set of instructions, or a lookup table, and calculating a total power consumption based on a sum of the computation energy consumption and the transmission energy consumption, the partitioning of the neural network model into the first portion and the second portion based on the total power consumption satisfying a power consumption threshold.

In Example 24, the subject matter of Examples 19-23 can optionally include that, further including assigning a first identifier to input data that the neural network model is to process, assigning a second identifier to the intermediate result, the second identifier to identify (i) the neural network model that is to be executed at the second edge node or the third edge node (ii) an initial layer of the second portion that the second edge node or the third edge node is to execute, sending the intermediate result to the second edge node or the third edge node with the second identifier, and determining a final result based on the intermediate result and the second identifier, the second identifier to identify the second portion of the neural network model that the second edge node or the third edge node is to execute.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to partition a neural network model comprising:
   interface circuitry to communicate with an edge device; and
   processor circuitry including one or more of:
      at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a first result of the one or more first operations, the instructions in the apparatus;
      a Field Programmable Gate Array (FPGA), the FPGA including first logic gate circuitry, a plurality of configurable interconnections, and storage circuitry, the first logic gate circuitry and interconnections to perform one or more second operations, the storage circuitry to store a second result of the one or more second operations; or
      Application Specific Integrate Circuitry (ASIC) including second logic gate circuitry to perform one or more third operations;
   the processor circuitry to perform at least one of the first operations, the second operations, or the third operations to instantiate:
      power consumption estimation circuitry to estimate a computation energy consumption for executing the neural network model on a first edge node, the neural network model corresponding to a platform service with a service level agreement timeframe;
      network bandwidth determination circuitry to determine a transmission time for sending an intermediate result from the first edge node to a second edge node or a third edge node;
      the power consumption estimation circuitry to estimate a transmission energy consumption for sending the intermediate result of the neural network model to the second edge node or the third edge node; and
      neural network partitioning circuitry to partition the neural network model into a first portion to be executed at the first edge node and a second portion to be executed at the second edge node or the third edge node based on at least one of the service level agreement timeframe for the platform service, the computation energy consumption, the transmission energy consumption, or the transmission time.

2. The apparatus of claim 1, wherein the processor circuitry is to perform at least one of the first operations, the second operations, or the third operations to instantiate the network bandwidth determination circuitry to determine the transmission time based on available network bandwidth and a payload size, the payload size including the intermediate result.

3. The apparatus of claim 1, wherein the transmission time is a first transmission time, and the processor circuitry is to perform at least one of the first operations, the second operations, or the third operations to instantiate the network bandwidth determination circuitry to:
   determine a second transmission time for sending a final result from the second edge node or the third edge node to the first edge node; and
   calculate a total transmission time based on a sum of the first transmission time and the second transmission time, the partitioning of the neural network model into the first portion and the second portion based on the total transmission time satisfying the service level agreement timeframe.

4. The apparatus of claim 1, wherein the processor circuitry is to perform at least one of the first operations, the second operations, or the third operations to instantiate the network bandwidth determination circuitry to:
   receive temperature data from a temperature sensor;
   receive wind data from a wind sensor; and
   receive humidity data from a humidity sensor, the estimation of at least one of the computation energy consumption or the transmission energy consumption based on at least one of the temperature data, the wind data, or the humidity data.

5. The apparatus of claim 1, wherein the processor circuitry is to perform at least one of the first operations, the second operations, or the third operations to instantiate the network bandwidth determination circuitry to:
   estimate at least the computation energy consumption or the transmission energy consumption based on at least one of an artificial intelligence algorithm, a set of instructions, or a lookup table; and
   calculate a total power consumption based on a sum of the computation energy consumption and the transmission energy consumption, the partitioning of the neural network model into the first portion and the second portion based on the total power consumption satisfying a power consumption threshold.

6. The apparatus of claim 1, wherein the processor circuitry is to:
   assign a first identifier to input data that the neural network model is to process;
   assign a second identifier to the intermediate result, the second identifier to identify (i) the neural network model that is to be executed at the second edge node or the third edge node (ii) an initial layer of the second portion that the second edge node or the third edge node is to execute;

send the intermediate result to the second edge node or the third edge node with the second identifier; and determine a final result based on the intermediate result and the second identifier, the second identifier to identify the second portion of the neural network model that the second edge node or the third edge node is to execute.

7. At least one non-transitory computer readable medium comprising instructions that, when executed, cause processor circuitry to at least:

infer a computation energy consumption for executing a neural network model on a first edge node, the neural network model corresponding to a platform service with a service level agreement timeframe;

compute a transmission time for transmitting an intermediate output from the first edge node to a second edge node or a third edge node;

infer a transmission energy consumption for transmitting the intermediate output of the neural network model to the second edge node or the third edge node; and segment the neural network model into a first portion to be executed at the first edge node and a second portion to be executed at the second edge node or the third edge node based on at least one of the service level agreement timeframe for the platform service, the computation energy consumption, the transmission energy consumption, or the transmission time.

8. The at least one non-transitory computer readable medium of claim 7, wherein the instructions, when executed, cause the processor circuitry to compute the transmission time based on available network bandwidth and a payload size, the payload size including the intermediate output.

9. The at least one non-transitory computer readable medium of claim 7, wherein the transmission time is a first transmission time, and the instructions, when executed, cause the processor circuitry to:

compute a second transmission time for sending a final result from the second edge node or the third edge node to the first edge node; and determine a total transmission time based on a sum of the first transmission time and the second transmission time, the segmenting of the neural network model into the first portion and the second portion based on the total transmission time satisfying the service level agreement timeframe.

10. The at least one non-transitory computer readable medium of claim 7, wherein the instructions, when executed, cause the processor circuitry to receive temperature data from a temperature sensor;

receive wind data from a wind sensor; and receive humidity data from a humidity sensor, the inference of at least one of the computation energy consumption or the transmission energy consumption based on at least one of the temperature data, the wind data, or the humidity data.

11. The at least one non-transitory computer readable medium of claim 7, wherein the instructions, when executed, cause the processor circuitry to:

infer at least the computation energy consumption or the transmission energy consumption based on at least one of an artificial intelligence algorithm, a set of instructions, or a lookup table; and compute a total power consumption based on a sum of the computation energy consumption and the transmission energy consumption, the segmentation of the neural network model into the first portion and the second portion based on the total power consumption satisfying a power consumption threshold.

12. The at least one non-transitory computer readable medium of claim 7, wherein the instructions, when executed, cause the processor circuitry to:

assign a first identifier to input data that the neural network model is to process;

assign a second identifier to the intermediate output, the second identifier to identify (i) the neural network model that is to be executed at the second edge node or the third edge node (ii) an initial layer of the second portion that the second edge node or the third edge node is to execute;

send the intermediate output to the second edge node or the third edge node with the second identifier; and determine a final result based on the intermediate output and the second identifier, the second identifier to identify the second portion of the neural network model that the second edge node or the third edge node is to execute.

13. An apparatus to partition a neural network model, the apparatus comprising:

means for determining a computation energy consumption for executing the neural network model on a first edge node, the neural network model corresponding to a platform service with a service level agreement timeframe, including means for determining a transmission energy consumption for sending an intermediate computation of the neural network model to a second edge node or a third edge node;

means for calculating a transmission time for sending the intermediate computation from the first edge node to the second edge node or the third edge node; and means for dividing the neural network model into a first portion to be executed at the first edge node and a second portion to be executed at the second edge node or the third edge node based on at least one of the service level agreement timeframe for the platform service, the computation energy consumption, the transmission energy consumption, and the transmission time.

14. The apparatus of claim 13, wherein the means for calculating is to calculate the transmission time based on available network bandwidth and a payload size, the payload size including the intermediate computation.

15. The apparatus of claim 13, wherein the transmission time is a first transmission time, and the means for calculating is to:

calculate a second transmission time for sending a final result from the second edge node or the third edge node to the first edge node; and compute a total transmission time based on a sum of the first transmission time and the second transmission time the dividing of the neural network model into the first portion and the second portion based on the total transmission time satisfying the service level agreement timeframe.

16. The apparatus of claim 13, wherein the means for determining is to determine at least one of the computation energy consumption or the transmission energy consumption based on received ambient data including at least one of temperature data, wind data, or humidity data.

17. The apparatus of claim 13, wherein the means for determining is to:

determine at least the computation energy consumption or the transmission energy consumption based on at least one of an artificial intelligence algorithm, a set of instructions, or a lookup table; and determine a total power consumption based on a sum of the computation energy consumption and the transmission energy consumption, the dividing of the neural network model into the first portion and the second portion based on the total power consumption satisfying a power consumption threshold.

18. The apparatus of claim 13, further including:

means for assigning a first identifier to input data that the neural network model is to process, the means for assigning is to assign a second identifier to the intermediate computation, the second identifier to identify (i) the neural network model that is to be executed at the second edge node or the third edge node (ii) an initial layer of the second portion that the second edge node or the third edge node is to execute;

means for sending the intermediate computation to the second edge node or the third edge node with the second identifier; and means for determining a final computation based on the intermediate computation and the second identifier, the second identifier to identify the second portion of the neural network model that the second edge node or the third edge node is to execute.

19. A method comprising:

estimating, by executing an instruction with processor circuitry, a computation energy consumption for executing a neural network model on a first edge node, the neural network model corresponding to a platform service with a service level agreement timeframe;

determining, by executing an instruction with the processor circuitry, a transmission time for sending an intermediate result from the first edge node to a second edge node or a third edge node;

estimating by executing an instruction with the processor circuitry, a transmission energy consumption for sending the intermediate result of the neural network model to the second edge node or the third edge node; and partitioning, by executing an instruction with the processor circuitry, the neural network model into a first portion to be executed at the first edge node and a second portion to be executed at the second edge node or the third edge node based on at least one of the service level agreement timeframe for the platform service, the computation energy consumption, the transmission energy consumption, or the transmission time.

20. The method of claim 19, wherein determining the transmission time is based on available network bandwidth and a payload size, the payload size including the intermediate result.

21. The method of claim 19, wherein the transmission time is a first transmission time, and further including:

determining a second transmission time for sending a final result from the second edge node or the third edge node to the first edge node; and calculating a total transmission time based on a sum of the first transmission time and the second transmission time, the partitioning of the neural network model into the first portion and the second portion based on the total transmission time satisfying the service level agreement timeframe.

22. The method of claim 19, wherein estimating the computation energy consumption includes:

receiving temperature data from a temperature sensor;

receiving wind data from a wind sensor; and receiving humidity data from a humidity sensor, the estimation of at least one of the computation energy consumption or the transmission energy consumption based on at least one of the temperature data, the wind data, or the humidity data.

23. The method of claim 19, further including:

estimating at least the computation energy consumption or the transmission energy consumption based on at least one of an artificial intelligence algorithm, a set of instructions, or a lookup table; and calculating a total power consumption based on a sum of the computation energy consumption and the transmission energy consumption, the partitioning of the neural network model into the first portion and the second portion based on the total power consumption satisfying a power consumption threshold.

24. The method of claim 19, further including:

assigning a first identifier to input data that the neural network model is to process;

assigning a second identifier to the intermediate result, the second identifier to identify (i) the neural network model that is to be executed at the second edge node or the third edge node (ii) an initial layer of the second portion that the second edge node or the third edge node is to execute;

sending the intermediate result to the second edge node or the third edge node with the second identifier; and determining a final result based on the intermediate result and the second identifier, the second identifier to identify the second portion of the neural network model that the second edge node or the third edge node is to execute.

* * * * *